(12) United States Patent
Gozu et al.

(10) Patent No.: US 11,731,362 B2
(45) Date of Patent: Aug. 22, 2023

(54) SHAPING STAGE AND THREE-DIMENSIONAL SHAPING DEVICE

(71) Applicant: SEIKO EPSON CORPORATION, Tokyo (JP)

(72) Inventors: Masayuki Gozu, Ina (JP); Kenichi Ono, Sakata (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/814,897

(22) Filed: Jul. 26, 2022

(65) Prior Publication Data
US 2023/0033100 A1 Feb. 2, 2023

(30) Foreign Application Priority Data

Jul. 28, 2021 (JP) .................. 2021-123065

(51) Int. Cl.
*B29C 64/30* (2017.01)
*B29C 64/245* (2017.01)
*B29C 64/209* (2017.01)
*B33Y 40/00* (2020.01)
*B33Y 30/00* (2015.01)

(52) U.S. Cl.
CPC ............ *B29C 64/30* (2017.08); *B29C 64/209* (2017.08); *B29C 64/245* (2017.08); *B33Y 30/00* (2014.12); *B33Y 40/00* (2014.12)

(58) Field of Classification Search
None
See application file for complete search history.

(56) References Cited

U.S. PATENT DOCUMENTS 9,597,731 B2 * 3/2017 Volk ..................... B33Y 30/00
2020/0361147 A1 11/2020 Beniya et al.

FOREIGN PATENT DOCUMENTS

| JP | 2018-183930 A | 11/2018 |
| JP | 2020-189485 A | 11/2020 |
| JP | 2020189485 A * | 11/2020 | ............ B22F 3/1055 |

* cited by examiner

*Primary Examiner* — Yung-Sheng M Tsui
(74) *Attorney, Agent, or Firm* — Workman Nydegger

(57) ABSTRACT

A shaping stage for three-dimensional shaping includes: a table having a shaping surface on which a shaping material is discharged; a posture adjusting unit configured to adjust a posture of the shaping surface; and a cooling unit configured to cool the posture adjusting unit.

10 Claims, 12 Drawing Sheets

SHAPING STAGE AND
THREE-DIMENSIONAL SHAPING DEVICE

The present application is based on, and claims priority from JP Application Serial Number 2021-123065, filed Jul. 28, 2021, the disclosure of which is hereby incorporated by reference herein in its entirety.

BACKGROUND

1. Technical Field

The present disclosure relates to a shaping stage and a three-dimensional shaping device.

2. Related Art

Regarding a shaping stage for three-dimensional shaping, JP-A-2020-189485 describes a technique in which four corners of a shaping table are supported by a support unit including an adjusting unit configured to adjust a height, and a posture of the shaping table is adjusted by adjusting the height by the adjusting unit.

In three-dimensional shaping using a shaping stage whose posture can be adjusted by an adjusting unit, a shaped object may be shaped in a state where a temperature of a shaping table is raised by being heated. In this case, a posture of the shaping table may not be stable due to thermal expansion of the adjusting unit along with heating of the shaping table, and it may take a long time to adjust the posture of the shaping table.

SUMMARY

According to a first aspect of the present disclosure, a shaping stage for three-dimensional shaping is provided. The shaping stage includes: a table having a shaping surface on which a shaping material is discharged; a posture adjusting unit configured to adjust a posture of the shaping surface; and a cooling unit configured to cool the posture adjusting unit.

According to a second aspect of the present disclosure, a three-dimensional shaping device is provided. The three-dimensional shaping device includes: the shaping stage in the above aspect; a nozzle configured to discharge the shaping material to the shaping surface through a nozzle opening on a tip surface; a heating unit configured to heat the table; and a detecting unit configured to detect a parallelism between the tip surface and the shaping surface.

DESCRIPTION OF EXEMPLARY EMBODIMENTS

A. First Embodiment

Figure 1:
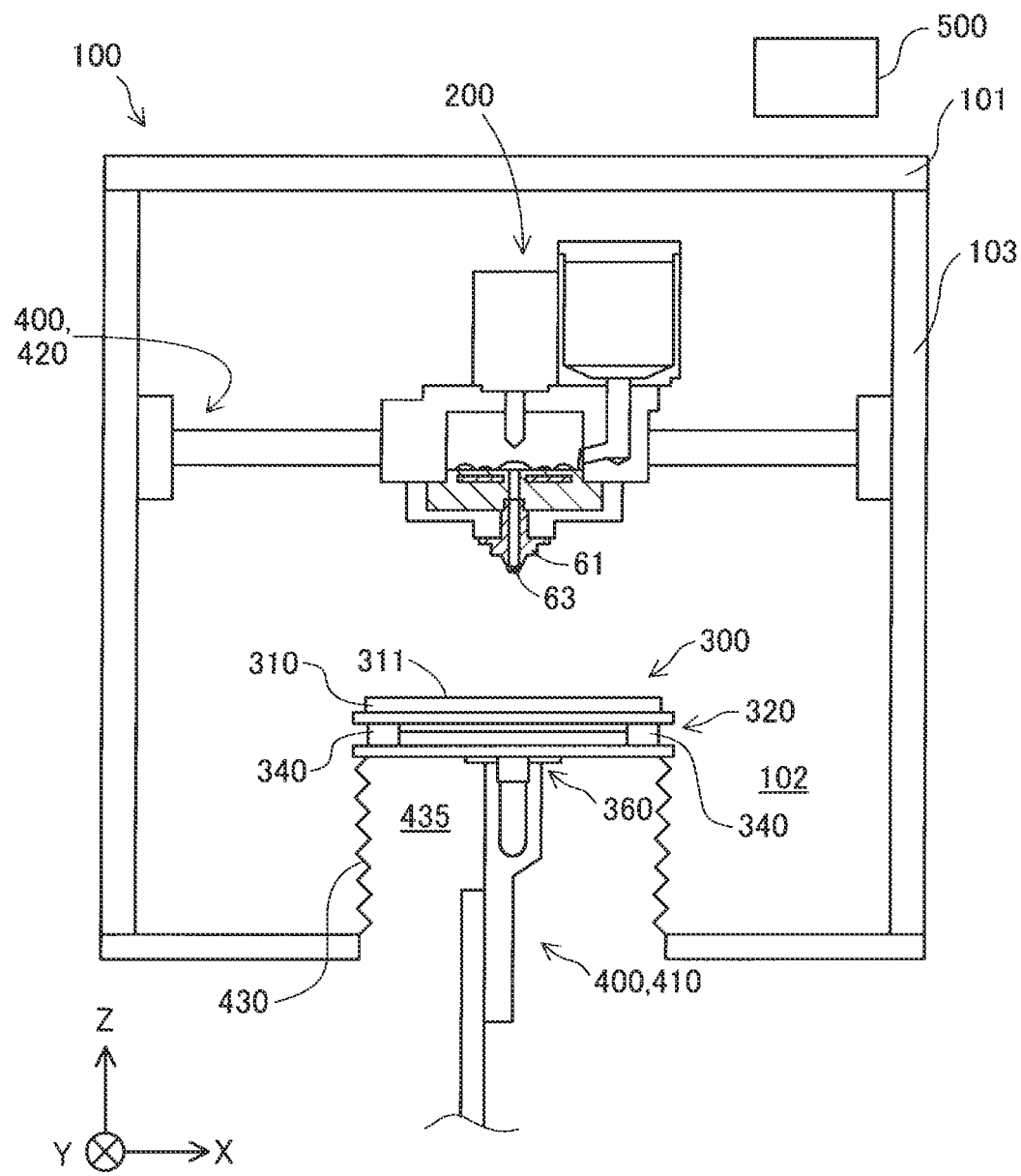
FIG. 1 is an explanatory diagram illustrating a schematic configuration of a three-dimensional shaping device of a first embodiment.

FIG. 1 is an explanatory diagram illustrating a schematic configuration of a three-dimensional shaping device 100 of a first embodiment. FIG. 1 illustrates arrows along X, Y, and Z directions which are orthogonal to each other. The X, Y, and Z directions are directions along an X-axis, a Y-axis, and a Z-axis which are three spatial axes orthogonal to each other, and each include a direction on one side along the X-axis, the Y-axis, or the Z-axis and a direction opposite thereto. The X-axis and the Y-axis are axes along a horizontal plane, and the Z-axis is an axis along a vertical line. Other drawings also appropriately illustrate arrows along the X, Y, and Z directions. The X, Y, and Z directions in FIG. 1 and the X, Y, and Z directions in other drawings represent the same directions. Hereinafter, a +Z direction is also referred to as "upper", and a −Z direction is also referred to as "lower".

The three-dimensional shaping device 100 includes a chamber 101, a discharging unit 200, a shaping stage 300 for three-dimensional shaping, a driving unit 400, and a control unit 500.

The chamber 101 has a shaping space 102 in which a three-dimensional shaped object is formed. The chamber 101 includes a partition wall 103 that surrounds the shaping space 102. The partition wall 103 is implemented by, for example, disposing a heat insulating material such as rock wool between an inner wall and an outer wall made of a metal such as stainless steel. The partition wall 103 insulates the shaping space 102 in the chamber 101 by such a configuration. As illustrated in FIG. 1, in the present embodiment, the discharging unit 200 and a part of the shaping stage 300 are provided in the shaping space 102.

Figure 2:
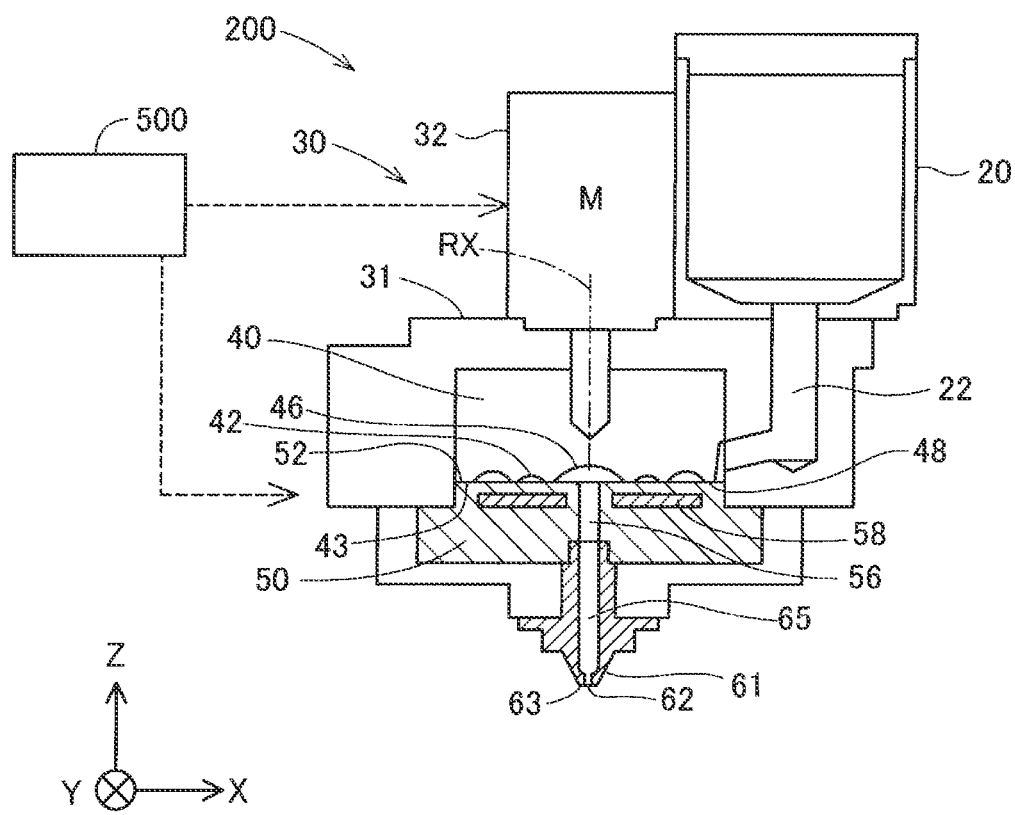
FIG. 2 is an explanatory diagram illustrating a schematic configuration of a discharging unit.

FIG. 2 is an explanatory diagram illustrating a schematic configuration of the discharging unit 200. Under control of the control unit 500, the discharging unit 200 discharges a shaping material obtained by melting a material in a solid state into a form of a paste onto the shaping stage 300. As illustrated in FIG. 2, the discharging unit 200 includes a material supply unit 20 as a supply source of the material before being converted into the shaping material, a plasticizing unit 30 that plasticizes the material to produce the shaping material, and a nozzle 61 through which the produced shaping material is discharged. The discharging unit 200 may be referred to as a head.

The material supply unit 20 accommodates the material in a form of pellets, powders, or the like. In the present embodiment, an ABS resin formed into a pellet shape is used as the material. The material supply unit 20 in the present embodiment is implemented by a hopper. A supply path 22 that couples the material supply unit 20 to the plasticizing unit 30 is provided below the material supply unit 20. The material supply unit 20 supplies the material to the plasticizing unit 30 via the supply path 22.

The plasticizing unit 30 includes a screw case 31, a drive motor 32, a screw 40, and a barrel 50. The plasticizing unit 30 plasticizes at least a part of the material supplied from the material supply unit 20, produces the paste-shaped shaping material having fluidity, and supplies the paste-shaped shaping material to the nozzle 61. A term "plasticizing" is a concept including melting, and includes a change from a solid state to a state having fluidity. Specifically, in a case of a material in which glass transition occurs, the plasticizing refers to setting a temperature of the material to be equal to or higher than a glass transition point. In a case of a material in which the glass transition does not occur, the plasticizing refers to setting a temperature of the material to be equal to or higher than a melting point. The screw 40 of the present embodiment may be referred to as a flat screw, or a scroll.

Figure 3:
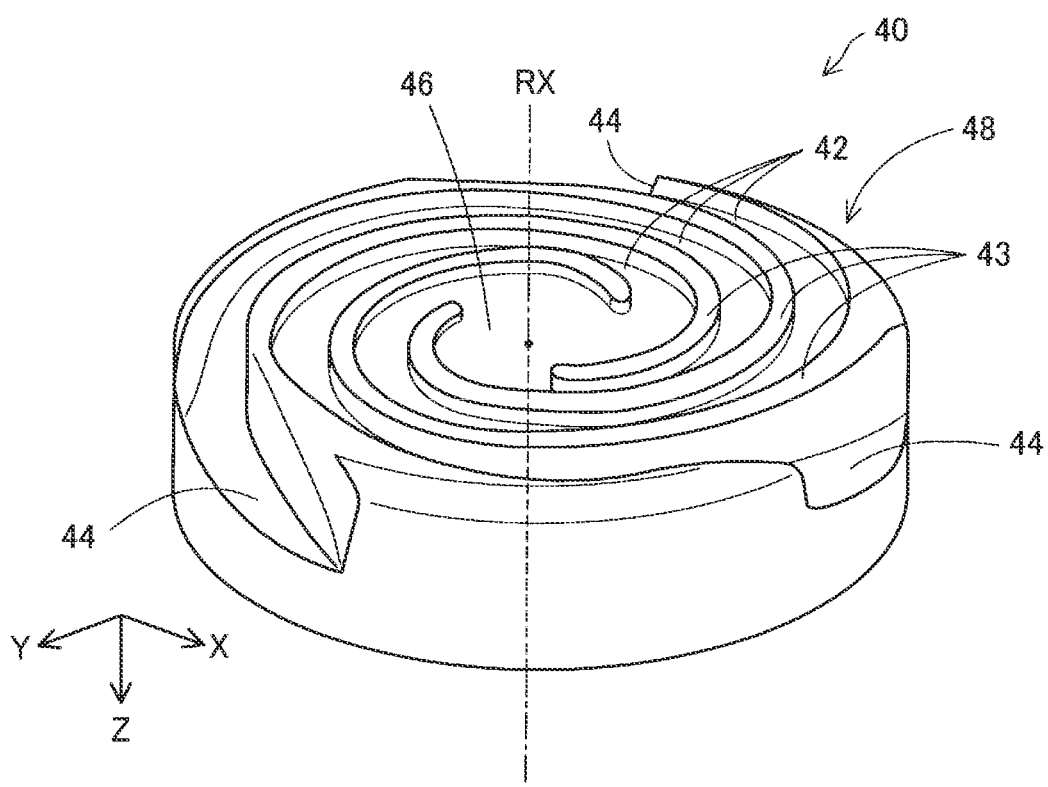
FIG. 3 is a perspective view illustrating a schematic configuration of a lower surface side of a screw.
Figure 4:
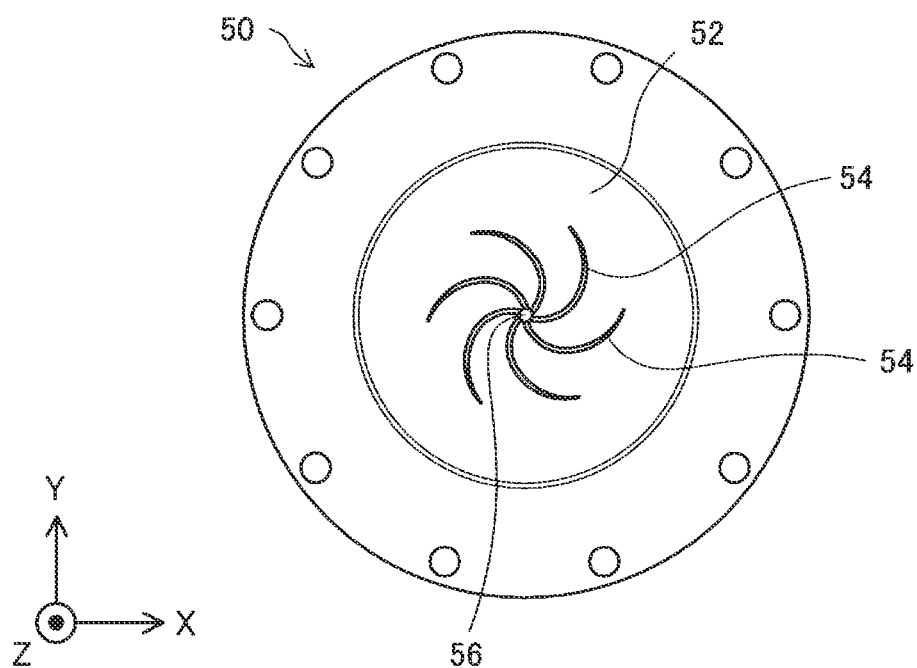
FIG. 4 is a schematic plan view illustrating an upper surface side of a barrel.

FIG. 3 is a perspective view illustrating a schematic configuration of a screw lower surface 48, which is a lower surface of the screw 40. FIG. 4 is a schematic plan view illustrating a barrel upper surface 52, which is an upper surface of the barrel 50. The screw 40 has a substantially cylindrical shape whose height in a direction along a central axis RX, which is a rotation center of the screw 40, is smaller than a diameter. The screw 40 is disposed such that the central axis RX is parallel to the Z direction.

As illustrated in FIG. 2, the screw 40 is accommodated in the screw case 31. An upper surface side of the screw 40 is coupled to the drive motor 32, and the screw 40 is rotated in the screw case 31 by a rotational drive force generated by the drive motor 32. The drive motor 32 is driven under the control of the control unit 500. The screw 40 may be driven by the drive motor 32 via a speed reducer.

As illustrated in FIG. 3, spiral groove portions 42 are formed on the screw lower surface 48. The supply path 22 of the material supply unit 20 described above communicates with the groove portions 42 from a side surface of the screw 40. Each of the groove portions 42 is continuous to a material introduction port 44 formed in the side surface of the screw 40. The material introduction port 44 is a portion for receiving the material supplied via the supply path 22 of the material supply unit 20. As illustrated in FIG. 2, in the present embodiment, three groove portions 42 are formed so as to be separated from each other by ridge portions 43. The number of the groove portions 42 is not limited to three, and may be one or two or more. A shape of the groove portions 42 is not limited to a spiral shape, and may be a helical shape or an involute curve shape, or may be a shape extending in a manner of drawing an arc from a central portion 46 toward an outer periphery.

As illustrated in FIG. 2, the barrel 50 is disposed below the screw 40. The barrel upper surface 52 faces the screw lower surface 48, and a space is formed between the groove portions 42 of the screw lower surface 48 and the barrel upper surface 52. The barrel 50 is provided with a communication hole 56 that communicates with a nozzle flow path 65 of the nozzle 61 to be described later on the central axis RX of the screw 40. A plasticizing heater 58 is built in the barrel 50 at a position facing the groove portions 42 of the screw 40. A temperature of the plasticizing heater 58 is controlled by the control unit 500.

The material supplied into the groove portions 42 of the screw 40 flows along the groove portions 42 by rotation of the screw 40 while being melted in the groove portions 42, and is guided as a shaping material to the central portion 46 of the screw 40. The paste-shaped shaping material that flows into the central portion 46 and exhibits fluidity is supplied to the nozzle 61 through the communication hole 56. In the shaping material, not all types of substances constituting the shaping material may be melted. The shaping material may be converted into a state having fluidity as a whole by plasticizing at least a part of types of the substances constituting the shaping material.

As illustrated in FIG. 2, the nozzle 61 includes the nozzle flow path 65 and a tip surface 63 provided with the nozzle opening 62. The nozzle flow path 65 is a flow path of the shaping material formed in the nozzle 61, and is coupled to the communication hole 56 of the barrel 50 described above. The tip surface 63 is a surface of the nozzle 61 that constitutes a tip portion protruding in a −Z direction toward a shaping surface 311. In the present embodiment, the tip surface 63 is a surface parallel to a horizontal plane. The nozzle opening 62 is provided at an end portion of the nozzle flow path 65 on a side communicating with the atmosphere, and is a portion where a flow path cross section of the nozzle flow path 65 is reduced. The shaping material produced by the plasticizing unit 30 is supplied to the nozzle 61 through the communication hole 56 and is discharged from the nozzle opening 62 via the nozzle flow path 65.

Figure 5:
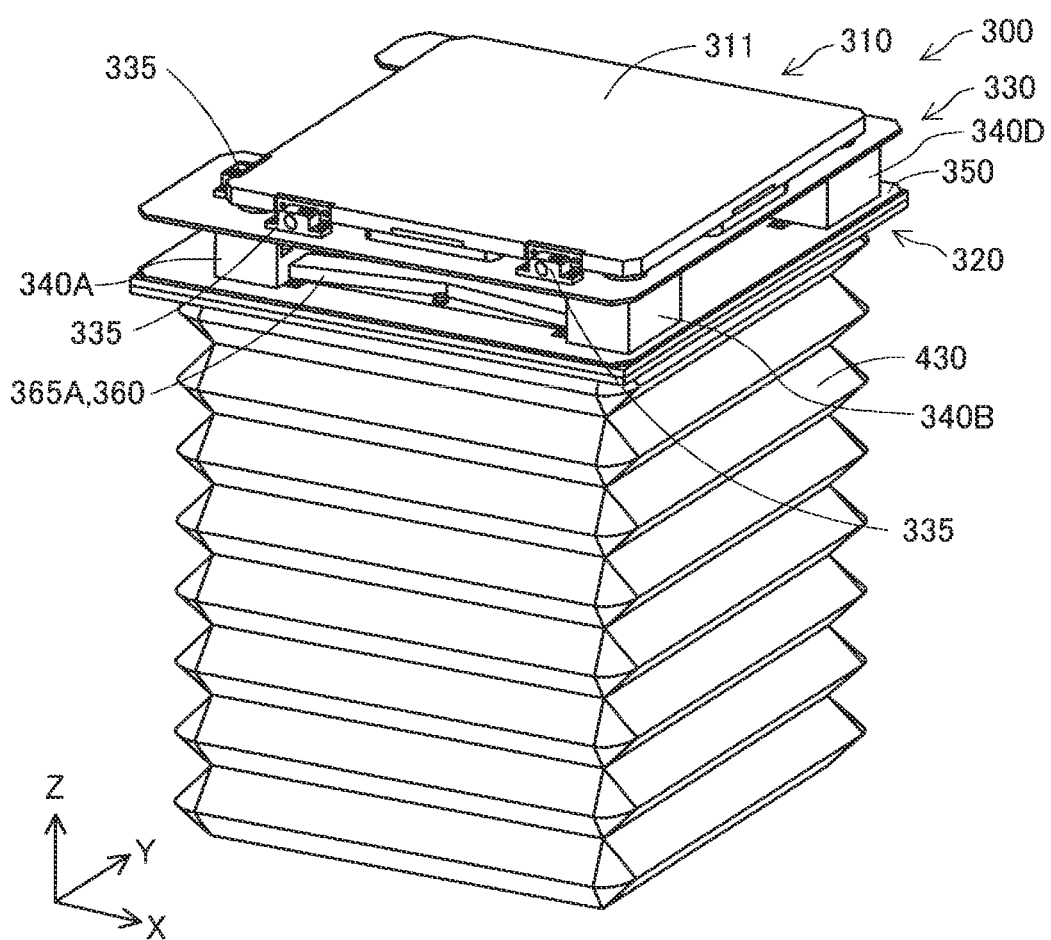
FIG. 5 is a first perspective view illustrating a shaping stage of the first embodiment.

FIG. 5 is a first perspective view illustrating the shaping stage 300 of the present embodiment. As illustrated in FIGS. 1 and 5, the shaping stage 300 includes a table 310 having the shaping surface 311 and serving as a base for a three-dimensional shaped object, a posture adjusting unit 320 that adjusts a posture of the shaping surface 311, and a cooling unit 360 that cools the posture adjusting unit 320. In the present embodiment, the shaping stage 300 further includes a support unit 330 that supports the table 310 and a substrate 350 for supporting the support unit 330. In the present embodiment, the table 310 and the substrate 350 are made of stainless steel and have a rectangular plate shape. The table 310 constitutes an upper surface of the shaping stage 300, and the substrate 350 constitutes a lower surface of the shaping stage 300. The shaping surface 311 is formed by an upper surface of the table 310 and has a rectangular shape. The discharging unit 200 described above discharges the shaping material from the nozzle 61 toward the shaping surface 311, and layers of the shaping material are stacked on the shaping surface 311, so that a three-dimensional shaped object is shaped.

The driving unit 400 illustrated in FIG. 1 changes a relative position of the discharging unit 200 and the shaping stage 300. In the present embodiment, the driving unit 400 includes a first driving unit 410 that moves the shaping stage 300 along the Z direction, and a second driving unit 420 that moves the discharging unit 200 along the X direction and the Y direction. The first driving unit 410 is implemented as an elevating device, and includes a motor for causing the shaping stage 300 to move in the Z direction. The second driving unit 420 is implemented as a horizontal conveyor, and includes a motor for causing the discharging unit 200 to slide along the X direction and a motor for causing the discharging unit 200 to slide along the Y direction. The motors are driven under the control of the control unit 500. In another embodiment, the driving unit 400 may be configured to cause the shaping stage 300 or the discharging unit 200 to move in the three directions of X, Y, and Z, or may be configured to cause the shaping stage 300 to move along the X direction and the Y direction and to cause the discharging unit 200 to move in the Z direction.

As illustrated in FIG. 1, an upper end portion of the first driving unit 410 is fixed to a lower surface of the substrate 350 of the shaping stage 300. In the present embodiment, a part of the first driving unit 410 is provided in a separation space 435. The separation space 435 is a space separated from the shaping space 102 in the chamber 101, and is partitioned by side walls of a telescopic member 430 and the substrate 350 of the shaping stage 300. As illustrated in FIGS. 1 and 5, the telescopic member 430 has a cylindrical shape and is disposed under the shaping stage 300. The lower surface of the substrate 350 is coupled to an upper end portion of the telescopic member 430. The side walls of the telescopic member 430 each have a bellows structure that can be telescoped along the Z direction. Accordingly, the telescopic member 430 stretches and telescopes according to the movement of the shaping stage 300 along the Z direction. Therefore, the first driving unit 410 is positioned outside the shaping space 102, and the shaping stage 300 can be moved along the Z direction while maintaining a state where the shaping surface 311 is positioned in the shaping space 102.

The control unit 500 is implemented by a computer including one or more processors, a main storage device, and an input and output interface that inputs and outputs a signal to and from an outside. In the present embodiment, the control unit 500 provides various functions such as a function of performing three-dimensional shaping processing by the processor executing a program or a command read onto the main storage device. The control unit 500 may be implemented by a combination of a plurality of circuits instead of the computer.

In the three-dimensional shaping processing, the control unit 500 controls the discharging unit 200 and the driving unit 400 in accordance with shaping data to shape a three-dimensional shaped object on the shaping surface 311. The shaping data includes shaping path data representing a movement path of the nozzle 61 relative to the table 310, and discharge amount data representing an amount of the shaping material to be discharged from the nozzle 61 associated with the shaping path data.

Figure 6:
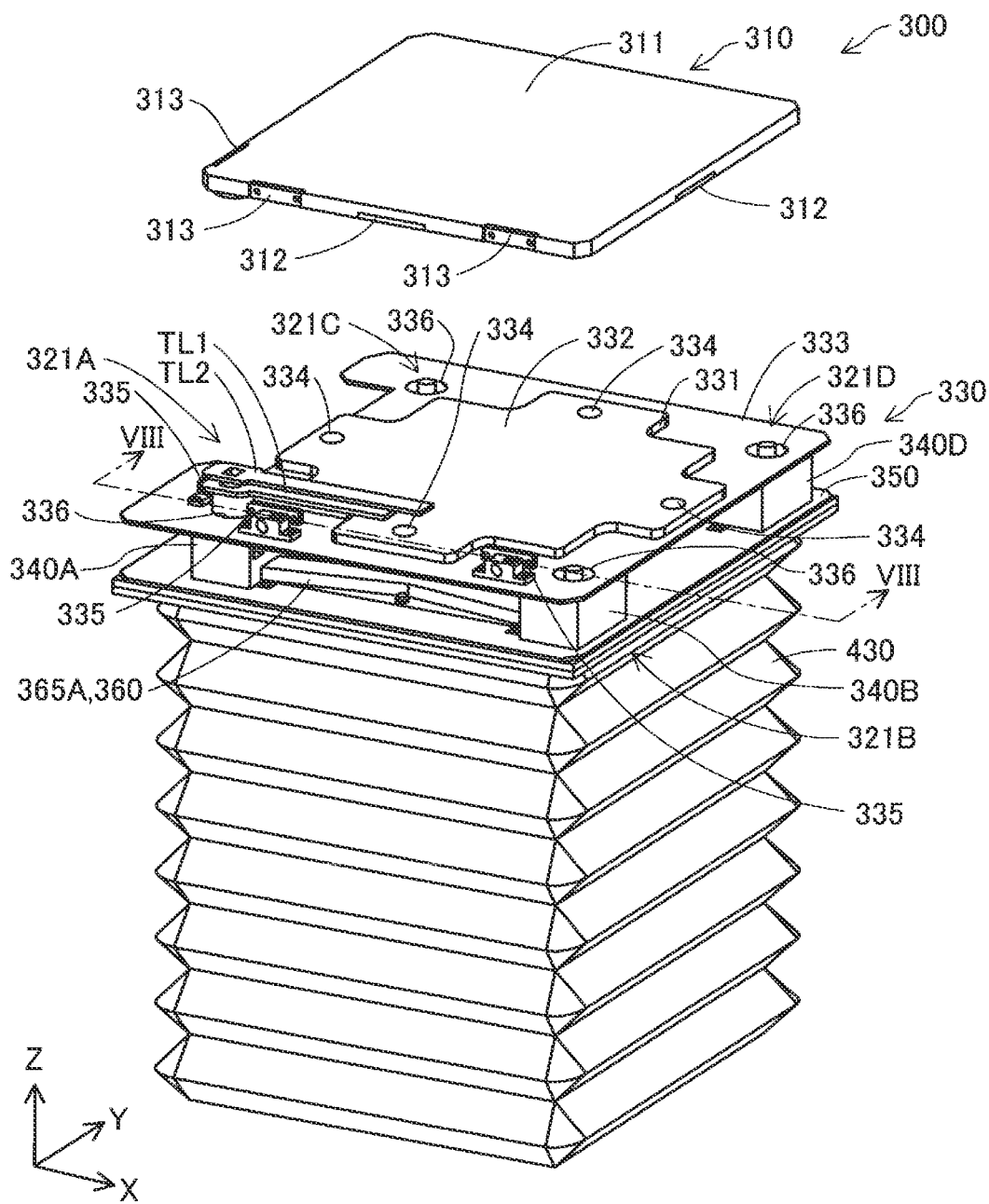
FIG. 6 is a second perspective view illustrating the shaping stage of the first embodiment.

FIG. 6 is a second perspective view illustrating the shaping stage 300 of the present embodiment. As will be described later, the support unit 330 of the shaping stage 300 detachably supports the table 310. FIG. 5 described above illustrates a state where the table 310 is attached to the support unit 330, and FIG. 6 illustrates a state where the table 310 is removed from the support unit 330. In addition, FIG. 6 illustrates a first tool TL1 and a second tool TL2, which are tools for adjusting a height of an individual adjusting unit 321 described later.

As illustrated in FIG. 6, the support unit 330 includes a mounting portion 331 having a mounting surface 332 on which the table 310 is mounted, and a support plate 333 to which the mounting portion 331 is fixed. The support plate 333 has a rectangular plate shape and is disposed below the mounting portion 331. An area of the shaping surface 311 is smaller than an area of a plate surface of the support plate 333. The mounting portion 331 in the present embodiment has a shape in which a part of each of four corners of the table 310 is cut off in the X direction and the Y direction. Therefore, an area of the mounting surface 332 is smaller than the area of the shaping surface 311. Hereinafter, a direction in which the table 310 is mounted on the mounting surface 332 may be referred to as a mounting direction. The mounting direction includes both a direction on one side and a direction opposite thereto along the same axis. The mounting direction in the present embodiment is the Z direction.

Figure 7:
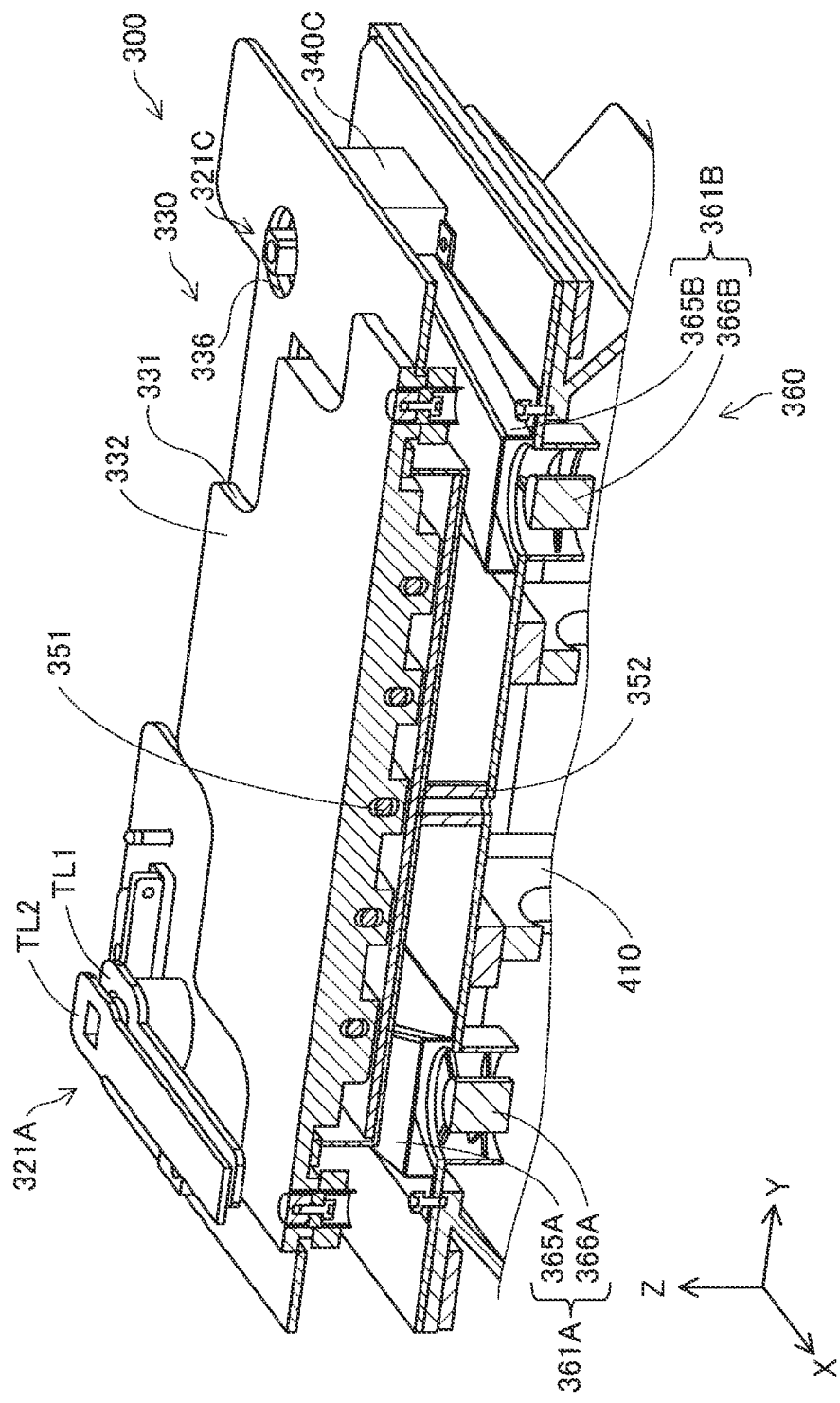
FIG. 7 is a perspective view illustrating a cross section of the shaping stage.

FIG. 7 is a perspective view illustrating a cross section of the shaping stage 300. FIG. 7 illustrates a cross section, along the Y direction and the Z direction, of a central portion of the shaping stage 300 in the X direction. Similar to FIG. 6, FIG. 7 illustrates the state where the table 310 is removed from the support unit 330. In addition, FIG. 7 illustrates the first tool TL1 and the second tool TL2. As illustrated in FIG. 7, the support unit 330 is supported by a central pillar 352 in a central portion in the X direction and the Y direction. The central pillar 352 is a shaft-shaped member, and is fixed to a central portion of the substrate 350 in the X direction and the Y direction such that an axial direction of the central pillar 352 is along the Z direction. The central pillar 352 also functions as a reference for determining a position of the entire support unit 330 in the Z direction.

The mounting portion 331 functions as a heating unit that heats the table 310. More specifically, as illustrated in FIG. 7, five heaters 351 for heating the table 310 are embedded in the mounting portion 331. The heaters 351 are implemented by rod-shaped cartridge heaters, and are arranged side by side along the Y direction such that axial directions are along the X direction. An output of each heater 351 is controlled by the control unit 500.

In the three-dimensional shaping processing of the present embodiment, before starting stacking the shaping material on the shaping surface 311, the control unit 500 controls the heaters 351 embedded in the mounting portion 331 to heat the table 310 mounted on the mounting surface 332 to a predetermined shaping temperature. Heating the table 310 to the shaping temperature before stacking the shaping material may be referred to as preheating. Then, the control unit 500 controls the heaters 351 to keep the temperature of the table 310 at the shaping temperature, and at the same time stacks the shaping material on the shaping surface 311 to shape a three-dimensional shaped object. Accordingly, warpage of the shaping material due to rapid cooling and shrinkage of the shaping material discharged to the shaping surface 311 is prevented, and a shaping accuracy of the three-dimensional shaped object can be improved.

As illustrated in FIG. 6, the support unit 330 of the present embodiment includes four first adsorbing portions 334 fixed to the mounting surface 332, and three second adsorbing portions 335 fixed to an upper surface of the support plate 333. When the table 310 is mounted on the mounting surface 332, the four first adsorbing portions 334 are arranged at positions respectively facing four first adsorbed portions 312 fixed to the lower surface of the table 310. In FIG. 6, only two of the four first adsorbed portions 312 are illustrated. When the table 310 is mounted on the mounting surface 332, the three second adsorbing portions 335 are arranged at positions respectively facing three second adsorbed portions 313 fixed to side surfaces of the table 310. In the present embodiment, when viewed along the Z direction, each of the first adsorbed portions 312 is provided at a portion overlapping a midpoint of each side of the shaping surface 311. One second adsorbed portion 313 is provided on the side surface of the table 310 in a −X direction, and two second adsorbed portions 313 are provided on the side surface of the table 310 in a −Y direction.

In the present embodiment, the first adsorbing portions 334 and the second adsorbing portions 335 are made of a permanent magnet. The first adsorbed portions 312 and the second adsorbed portions 313 are formed of a metal material that can be adsorbed by a magnetic force. Accordingly, the support unit 330 detachably fixes the table 310 mounted on the mounting surface 332 by a magnetic force of a magnet. In another embodiment, for example, both the table 310 and the support unit 330 may be provided with the magnets, or the table 310 may be provided with the magnet and the support unit 330 may be provided with a metal material that can be adsorbed by the magnetic force. That is, when the table 310 is detachably fixed to the support unit 330 by the magnetic force of the magnet, the magnet may be provided on at least one of the table 310 and the support unit 330.

As illustrated in FIG. 6, the posture adjusting unit 320 of the present embodiment includes four individual adjusting units 321. The individual adjusting units 321 support the support unit 330, and heights at which the individual adjusting units 321 support the support unit 330 can be individually adjusted. The posture adjusting unit 320 is configured to adjust a posture of the mounting surface 332 on which the table 310 is mounted by individually adjusting the individual adjusting units 321. In the present embodiment, when viewed along the Z direction, the four individual adjusting units 321 are arranged at positions corresponding to four corners of a rectangle. More specifically, when viewed along the Z direction, the individual adjusting units 321 are arranged at positions respectively corresponding to four corners of the rectangular support unit 330. In the present embodiment, when viewed along the Z direction, the positions where the individual adjusting units 321 are arranged are also positions respectively corresponding to corner portions of the rectangular shaping surface 311. In the present embodiment, the periphery of at least a part of each individual adjusting unit 321 in the Z direction is covered with a case 340.

In the present embodiment, when viewed along the Z direction, each of the individual adjusting units 321 is arranged at a position that overlaps an opening 336 of the support unit 330 and does not overlap the mounting portion 331. When viewed along the Z direction, each of the openings 336 is a through hole which is provided in the position overlapping the individual adjusting unit 321 and penetrates the support unit 330 in the Z direction. In the present embodiment, when viewed along the Z direction, the support unit 330 includes a total of four openings 336 formed in the positions respectively corresponding to the four corners of the support unit 330. The opening 336 is formed such that a tool for adjusting the height of the individual adjusting unit 321 can be inserted. As illustrated in FIG. 6, in the present embodiment, the opening 336 is formed such that the first tool TL1 and the second tool TL2 can be inserted.

Hereinafter, in order to distinguish each of the individual adjusting units 321, each of the individual adjusting units 321 may be referred to as a first adjusting unit 321A, a second adjusting unit 321B, a third adjusting unit 321C, or a fourth adjusting unit 321D. Similarly, the cases 340 that cover the first adjusting unit 321A to the fourth adjusting unit 321D may be referred to as a first case 340A to a fourth case 340D. Among the four individual adjusting units 321, the first adjusting unit 321A is arranged at a most −X direction position and a most −Y direction position. The second adjusting unit 321B is arranged at a position in a +X direction of the first adjusting unit 321A. The third adjusting unit 321C is arranged at a position in a +Y direction of the first adjusting unit 321A. The fourth adjusting unit 321D is arranged at a position in a +Y direction of the second adjusting unit 321B and a position in a +X direction of the third adjusting unit 321C. In FIG. 6, the first tool TL1 and the second tool TL2 are coupled to the first adjusting unit 321A.

Figure 8:
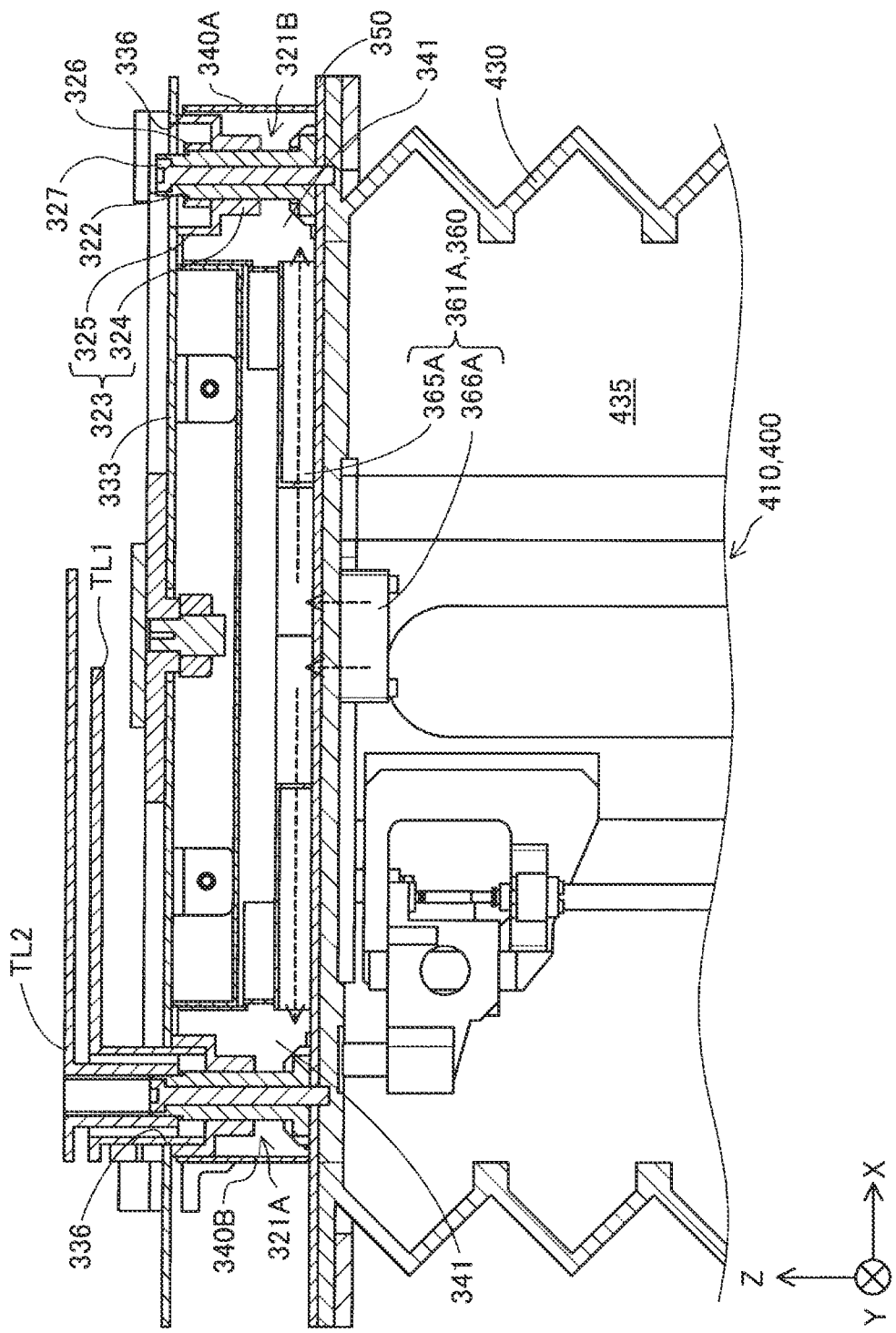
FIG. 8 is a cross-sectional view taken along a line VIII-VIII in FIG. 6.

FIG. 8 is a cross-sectional view taken along a line VIII-VIII in FIG. 6. As illustrated in FIG. 8, the individual adjusting unit 321 includes a shaft-shaped member 322, a pedestal portion 323, a fixing nut 326, and a fixing screw 327. Similar to FIGS. 6 and 7, FIG. 8 illustrates the state where the table 310 is removed from the support unit 330. In addition, FIG. 8 illustrates the first tool TL1 and the second tool TL2.

The shaft-shaped member 322 has a shaft shape whose axial direction is a longitudinal direction. In the present embodiment, the shaft-shaped member 322 is formed of electroless nickel-plated stainless steel. The shaft-shaped member 322 is vertically provided on the substrate 350 such that the longitudinal direction is along the Z direction. The shaft-shaped member 322 projects an end portion thereof in a +Z direction toward a +Z direction of the support plate 333 through the opening 336 formed in the support plate 333. The shaft-shaped member 322 is formed with a through hole that penetrates the shaft-shaped member 322 in the longitudinal direction and into which the fixing screw 327 is inserted. A male screw is formed on an outer surface of the shaft-shaped member 322.

The pedestal portion 323 has a cylindrical shape. In the present embodiment, the pedestal portion 323 is formed of stainless steel. In the axial direction, the pedestal portion 323 includes a first portion 324 having an inner diameter corresponding to an outer diameter of the shaft-shaped member 322, and a second portion 325 having an inner diameter larger than the inner diameter of the first portion 324. A female screw to be screwed with the male screw of the shaft-shaped member 322 is formed on an inner surface of the first portion 324. The pedestal portion 323 is disposed between the support plate 333 and the substrate 350 in a state where the second portion 325 is located in a +Z direction of the first portion 324, and the male screw of the shaft-shaped member 322 inserted through the pedestal portion 323 is screwed with the female screw of the first portion 324. An end portion of the second portion 325 in a +Z direction is fixed to a lower surface of the support plate 333 in the vicinity of the opening 336. Therefore, by rotating the shaft-shaped member 322 on the spot, the pedestal portion 323 can be moved along the Z direction, and a position of the support plate 333 fixed to the pedestal portion 323 can be changed in the Z direction. As described above, the individual adjusting units 321 are configured such that the heights at which the support unit 330 is supported can be individually adjusted. Hereinafter, the height of the individual adjusting unit 321 that supports the support unit 330 may be simply referred to as the "height of the individual adjusting unit 321".

The fixing nut 326 and the fixing screw 327 are members for fixing the height at which the pedestal portion 323 supports the support plate 333. The fixing nut 326 restricts the movement of the pedestal portion 323 in the +Z direction by being fastened between an inner surface of the second portion 325 and the outer surface of the shaft-shaped member 322 so as to press the first portion 324 in the −Z direction. The fixing screw 327 is inserted into the through hole formed in the shaft-shaped member 322 to fix the shaft-shaped member 322 to the substrate 350 and restrict the rotation of the shaft-shaped member 322.

As illustrated in FIGS. 6 to 8, in the present embodiment, the height of the individual adjusting unit 321 is adjusted by using the first tool TL1 and the second tool TL2. The first tool TL1 is implemented by a socket wrench for rotating the fixing nut 326. The second tool TL2 is implemented by a socket wrench for rotating the shaft-shaped member 322. A socket portion of the first tool TL1 is configured such that a socket portion of the second tool TL2 can be inserted.

In the present embodiment, the height of the individual adjusting unit 321 can be adjusted from a side on which the table 310 of the mounting unit 331 is mounted, that is, from above the mounting portion 331. More specifically, the height of the individual adjusting unit 321 can be adjusted by the first tool TL1 and the second tool TL2 which are inserted into the opening 336. When the height of the individual adjusting unit 321 is adjusted, first, the fixing screw 327 inserted in the shaft-shaped member 322 is loosened. Next, a socket of the first tool TL1 is inserted into the opening 336 from above the opening 336, the socket of the first tool TL1 is fitted into the fixing nut 326, and the fixing nut 326 is loosened. Then, a socket of the second tool TL2 is inserted into the opening 336 from above the opening 336, the socket of the second tool TL2 is fitted to the shaft-shaped member 322, and the shaft-shaped member 322 is rotated, so that a position of the pedestal portion 323 in the Z direction is adjusted. Thereafter, the height of the individual adjusting unit 321 is fixed by the fixing nut 326 and the fixing screw 327.

The height of the individual adjusting unit 321 is adjusted, so that an inclination of the mounting surface 332 with respect to the horizontal plane is adjusted. Accordingly, an inclination of the shaping surface 311 of the table 310 mounted on the mounting surface 332 with respect to the horizontal plane is adjusted. In the present embodiment, the individual adjusting units 321 are individually adjusted in this way, so that the posture of the mounting surface 332 is adjusted, and the posture of the shaping surface 311 is adjusted. The posture of the shaping surface 311 is adjusted such that, for example, a degree of parallelism between the shaping surface 311 and the tip surface 63 of the nozzle 61 is equal to or higher than a predetermined degree. The degree of parallelism between the shaping surface 311 and the tip surface 63 is expressed by, for example, a variation in a distance between a plane parallel to one of the shaping surface 311 and the tip surface 63 and the other surface for each measuring position. In this case, the smaller the variation in the distance, the higher the degree of parallelism between the shaping surface 311 and the tip surface 63. In particular, in the present embodiment, since the tip surface 63 is parallel to the horizontal plane, the degree of parallelism between the shaping surface 311 and the tip surface 63 can be expressed by a variation in a distance between the shaping surface 311 and the horizontal plane. For example, when the variation in the distance between the shaping surface 311 and the horizontal plane is within 0.01% of a dimension of the shaping surface 311 in the longitudinal direction, it may be determined that the degree of parallelism is equal to or higher than a predetermined degree. By increasing the degree of parallelism to the predetermined degree or higher, a movement accuracy of the nozzle 61 relative to the shaping stage 300 in accordance with the shaping data can be improved, and thus there is a high possibility that a three-dimensional shaped object can be shaped with high accuracy.

Figure 9:
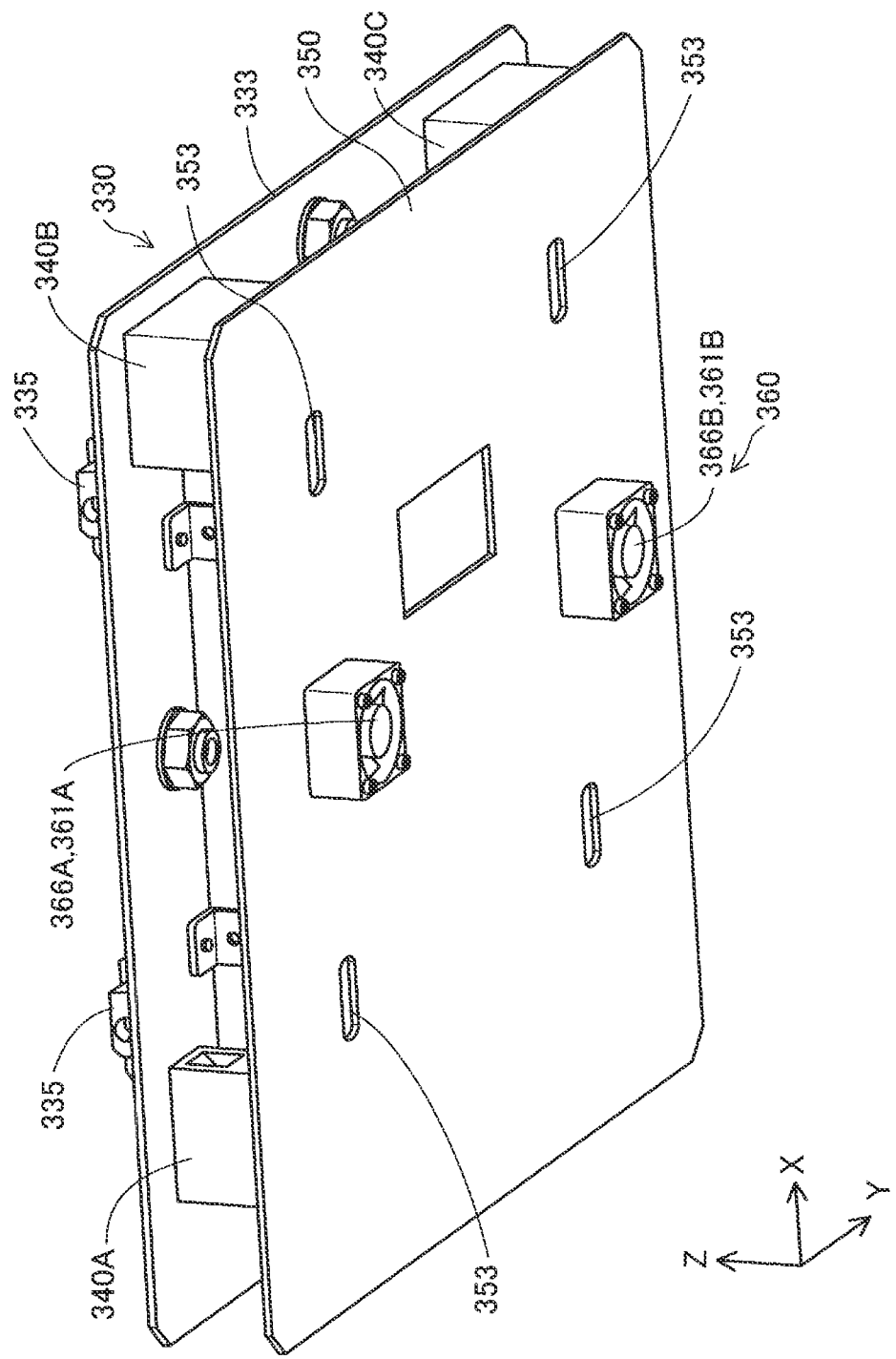
FIG. 9 is a perspective view illustrating a lower surface of a substrate.

FIG. 9 is a perspective view illustrating the lower surface of the substrate 350. As illustrated in FIGS. 7 and 9, the cooling unit 360 in the present embodiment includes a first air blowing unit 361A and a second air blowing unit 361B that supply air to the posture adjusting unit 320. As illustrated in FIGS. 6 to 9, the first air blowing unit 361A includes a first air flow path 365A through which the air is distributed to the first adjusting unit 321A and the second adjusting unit 321B, and a first air blowing mechanism 366A that blows the air into the first air flow path 365A. Similarly, the second air blowing unit 361B includes a second air flow path 365B through which the air is distributed to the third adjusting unit 321C and the fourth adjusting unit 321D, and a second air blowing mechanism 366B that aspirates the air into the second air flow path 365B. Hereinafter, the first air blowing unit 361A and the second air blowing unit 361B may be simply referred to as air blowing units 361 when they are not distinguished. Similarly, the first air flow path 365A and the second air flow path 365B may be simply referred to as air flow paths 365 when they are not distinguished, and the first air blowing mechanism 366A and the second air blowing mechanism 366B may be simply referred to as air blowing mechanisms 366 when they are not distinguished.

The air blowing mechanism 366 in the present embodiment is implemented by an aspiration fan that blows the air into the air flow path 365. Drive of the air blowing mechanism 366 is controlled by the control unit 500. The first air flow path 365A is implemented by an air duct that couples the first air blowing mechanism 366A to a first case 340A and a second case 340B. The second air flow path 365B is implemented by an air duct that couples the second air blowing mechanism 366B to a third case 340C and a fourth case 340D. In another embodiment, the air flow path 365 and the air blowing mechanism 366 may supply, to the posture adjusting unit 320, an inert gas such as nitrogen instead of the air, for example.

As illustrated in FIGS. 7 and 9, in the present embodiment, the first air blowing mechanism 366A and the second air blowing mechanism 366B are fixed to the central portion of the substrate 350 in the X direction so as to penetrate the substrate 350 in the Z direction. The second air blowing mechanism 366B is located in a +Y direction of the first air blowing mechanism 366A. In the first air flow path 365A of the present embodiment, a flow path length from the first air blowing mechanism 366A to the first adjusting unit 321A is equal to a flow path length from the first air blowing mechanism 366A to the second adjusting unit 321B. Similarly, in the second air flow path 365B, a flow path length from the second air blowing mechanism 366B to the third adjusting unit 321C is equal to a flow path length from the second air blowing mechanism 366B to the fourth adjusting unit 321D.

In FIG. 8, flow of the air in the air flow paths 365 is illustrated by broken lines. As illustrated in FIG. 8, the air introduced from the separation space 435 into the air flow paths 365 by the air blowing mechanisms 366 passes through the air flow paths 365 and is supplied to internal spaces 341 in the cases 340 accommodating the individual adjusting units 321. The air supplied to the internal spaces 341 is subjected to heat exchange with the individual adjusting units 321 and then is discharged to the separation space 435 through exhaust ports 353 illustrated in FIG. 9. The exhaust ports 353 are holes formed through the substrate 350 in the Z direction and communicating the internal spaces 341 and the separation space 435. Accordingly, the cooling unit 360 cools the posture adjusting unit 320 by supplying the air to the posture adjusting unit 320. In another embodiment, for example, a fan for supplying cooling air to the separation space 435 may be provided below the separation space 435 or the like.

The shaping stage 300 in the present embodiment described above includes the cooling unit 360 that cools the posture adjusting unit 320. According to such an embodiment, when the table 310 is heated by the heating unit, the posture adjusting unit 320 is cooled by the cooling unit 360, so that temperature rise of the posture adjusting unit 320 due to temperature rise of the table 310 can be prevented.

Accordingly, as compared with a case where the posture adjusting unit 320 is not cooled, a dimensional change due to thermal expansion of the posture adjusting unit 320 can be prevented, and a dimension of the posture adjusting unit 320 can be stabilized more quickly. Therefore, a posture of the table 310 can be stabilized more quickly, and there is a high possibility that a time required for adjusting the posture of the table 310 can be shortened.

In the present embodiment, the cooling unit 360 includes the air blowing units 361 that supply the air to the posture adjusting unit 320. Therefore, by supplying the air to the posture adjusting unit 320 by the air blowing units 361, the posture adjusting unit 320 can be easily cooled.

In addition, in the present embodiment, the shaping stage 300 includes the support unit 330 having the mounting surface 332 and detachably supporting the table 310, and the posture adjusting unit 320 includes the plurality of individual adjusting units 321 supporting the support unit 330, and is configured to adjust the posture of the mounting surface 332 by individually adjusting the individual adjusting units 321. Therefore, by individually adjusting the individual adjusting units 321 to adjust the posture of the mounting surface 332, the posture of the shaping surface 311 can be adjusted with high accuracy.

In the present embodiment, when viewed along the Z direction, the posture adjusting unit 320 includes the four individual adjusting units 321 which are arranged at the positions respectively corresponding to the four corners of the rectangular support unit 330. Therefore, by individually adjusting the individual adjusting units 321, the posture of the shaping surface 311 can be adjusted with high accuracy. For example, as compared with an aspect in which the support unit 330 is supported by three or less individual adjusting units 321, a load applied to each individual adjusting unit 321 is smaller, so that a durability of the individual adjusting units 321 is improved.

In the present embodiment, the air blowing unit 361 includes the air flow path 365 through which the air is distributed to the plurality of individual adjusting units 321 and the air blowing mechanism 366 that blows the air into the air flow paths 365. Accordingly, the plurality of individual adjusting units 321 can be easily cooled at one time as compared with, for example, a case where the air flow path 365 and the air blowing mechanism 366 are individually provided for each of the individual adjusting units 321. In particular, in the present embodiment, since the flow path lengths between the air blowing mechanism 366 and the individual adjusting units 321 in one air flow path 365 are the same, the individual adjusting units 321 cooled by the cooling unit 360 are easily cooled to the same extent.

In addition, in the present embodiment, when viewed along the Z direction, the support unit 330 has the openings 336 at the positions overlapping the individual adjusting units 321, the opening 336 is formed such that the tool for adjusting the individual adjusting unit 321 can be inserted, and the individual adjusting unit 321 is configured to be adjusted by the tool inserted into the opening 336. Accordingly, the tool can be inserted into the opening 336 from above the support unit 330 to adjust the individual adjusting unit 321. Therefore, the individual adjusting units 321 can be adjusted more easily. In particular, even when the periphery of the individual adjusting units 321 in the X direction and the Y direction is covered by the cases 340 as in the present embodiment, the individual adjusting units 321 can be adjusted easily.

In the present embodiment, the table 310 is detachably fixed to the support unit 330 by the magnetic force of the magnet provided on at least one of the table 310 and the support unit 330. Therefore, the table 310 can be detachably fixed to the support unit 330 with a simple configuration.

B. Second Embodiment

Figure 10:
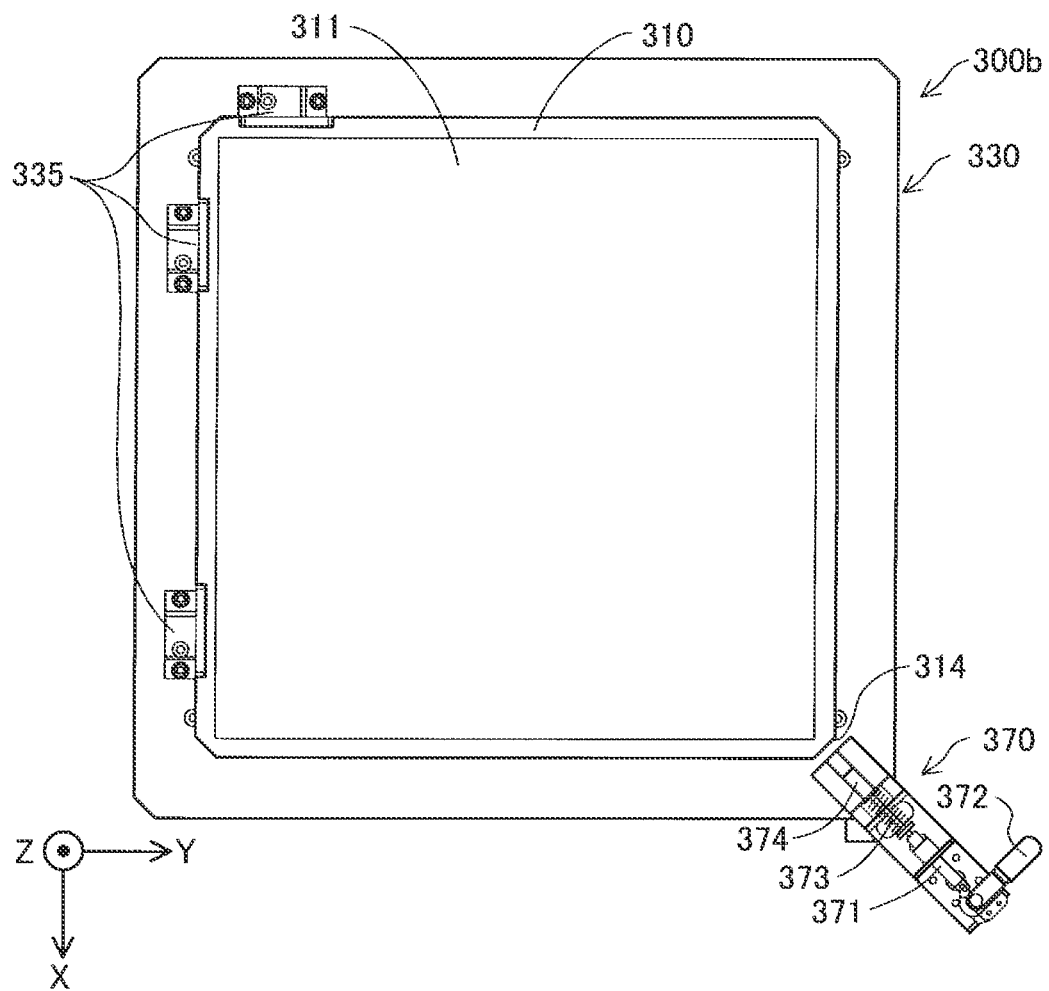
FIG. 10 is a top view illustrating a schematic configuration of a shaping stage of a second embodiment.

FIG. 10 is a top view illustrating a schematic configuration of a shaping stage 300b of a second embodiment. In the present embodiment, unlike the first embodiment, the table 310 of the shaping stage 300b is sandwiched and supported by the second adsorbing portions 335 that function as receiving portions and an urging member 370 that urges the table 310 toward the receiving portions. In the configurations of the three-dimensional shaping device 100 and the shaping stage 300b of the second embodiment, a part not particularly described is the same as that in the first embodiment.

Figure 11:
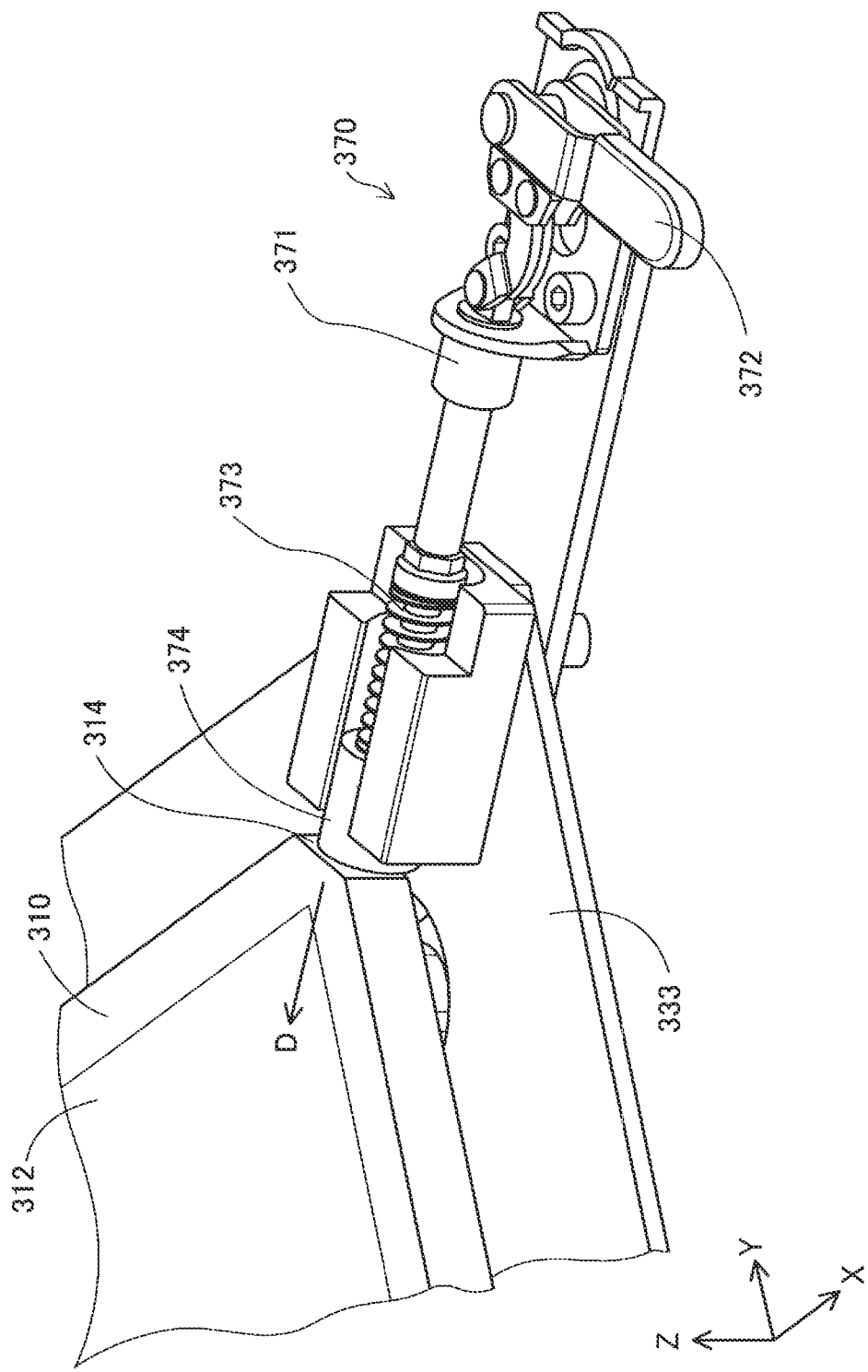
FIG. 11 is a perspective view illustrating an urging member.

FIG. 11 is a perspective view illustrating the urging member 370. In the present embodiment, the urging member 370 is disposed at an end portion of the substrate 350 in the +X direction and the +Y direction. The urging member 370 of the present embodiment includes a main body portion 371 implemented by a toggle clamp, an elastic member 373 fixed to the main body portion 371, and a tip member 374 fixed to the elastic member 373. In the present embodiment, the elastic member 373 is implemented by a spring. The tip member 374 is made of stainless steel. The main body portion 371 is fixed to the substrate 350 such that the tip member 374 faces a corner surface 314 of the table 310 mounted on the support unit 330. The corner surface 314 is a side surface of an end portion of the table 310 in the +X direction and the +Y direction.

In the main body portion 371, by operating a handle 372, the elastic member 373 and the tip member 374 fixed to the main body portion 371 can advance so as to approach the corner surface 314, or can retract so as to move away from the corner surface 314. FIG. 10 illustrates a state where the tip member 374 and the corner surface 314 are separated from each other. For example, when the table 310 is removed from the support unit 330, the handle 372 is operated such that the tip member 374 and the corner surface 314 are separated from each other as illustrated in FIG. 10. FIG. 11 illustrates a state where the tip member 374 and the corner surface 314 are in contact with each other and the table 310 is urged by an urging force of the elastic member 373. In the present embodiment, the table 310 is urged by the urging member 370 in a direction along the shaping surface 311, and more specifically, is urged in a direction D from the corner surface 314 toward a center of the table 310 when viewed along the Z direction.

As illustrated in FIG. 10, the second adsorbing portions 335 functioning as the receiving portions are in contact with the side surfaces of the table 310 mounted on the support unit 330. The second adsorbing portions 335 receive the table 310 urged by the urging member 370. Accordingly, the table 310 mounted on the support unit 330 is sandwiched and supported by the urging member 370 and the second adsorbing portions 335, so that a position shift of the table 310 due to the movement of the shaping stage 300b or the like is prevented. In particular, since the table 310 is sandwiched and supported in the direction along the shaping surface 311, the position shift of the table 310 in the X direction and the Y direction can be effectively prevented. Therefore, for example, in another embodiment, when the shaping stage 300b is configured to move along the X direction and the Y direction with respect to the discharging unit 200, the position shift of the table 310 also can be effectively prevented. The receiving portion does not have to be in contact with the side surface of the table 310 by a surface, and may be in contact with the side surface by a line or a point.

When the table 310 is heated, thermal expansion of the table 310 increases a dimension of the table 310. In the present embodiment, when the table 310 is heated, the urging member 370 tolerates changes in the dimensions in the X direction and the Y direction due to the thermal expansion of the table 310, so that deformation such as warpage due to the thermal expansion of the table 310 is prevented. Accordingly, even when the table 310 is heated, flatness of the shaping surface 311 is easily kept higher, so that, for example, the degree of parallelism between the shaping surface 311 and the tip surface 63 can be further increased.

According to the shaping stage 300b of the present embodiment described above, the table 310 supported by the support unit 330 is sandwiched and supported by the receiving portions that are in contact with the side surfaces of the table 310 and the urging member 370 that urges the table 310 toward the receiving portions. Therefore, the position shift of the table 310 mounted on the support unit 330 can be prevented, and the deformation such as the warpage of the heated table 310 can be prevented.

C. Third Embodiment

Figure 12:
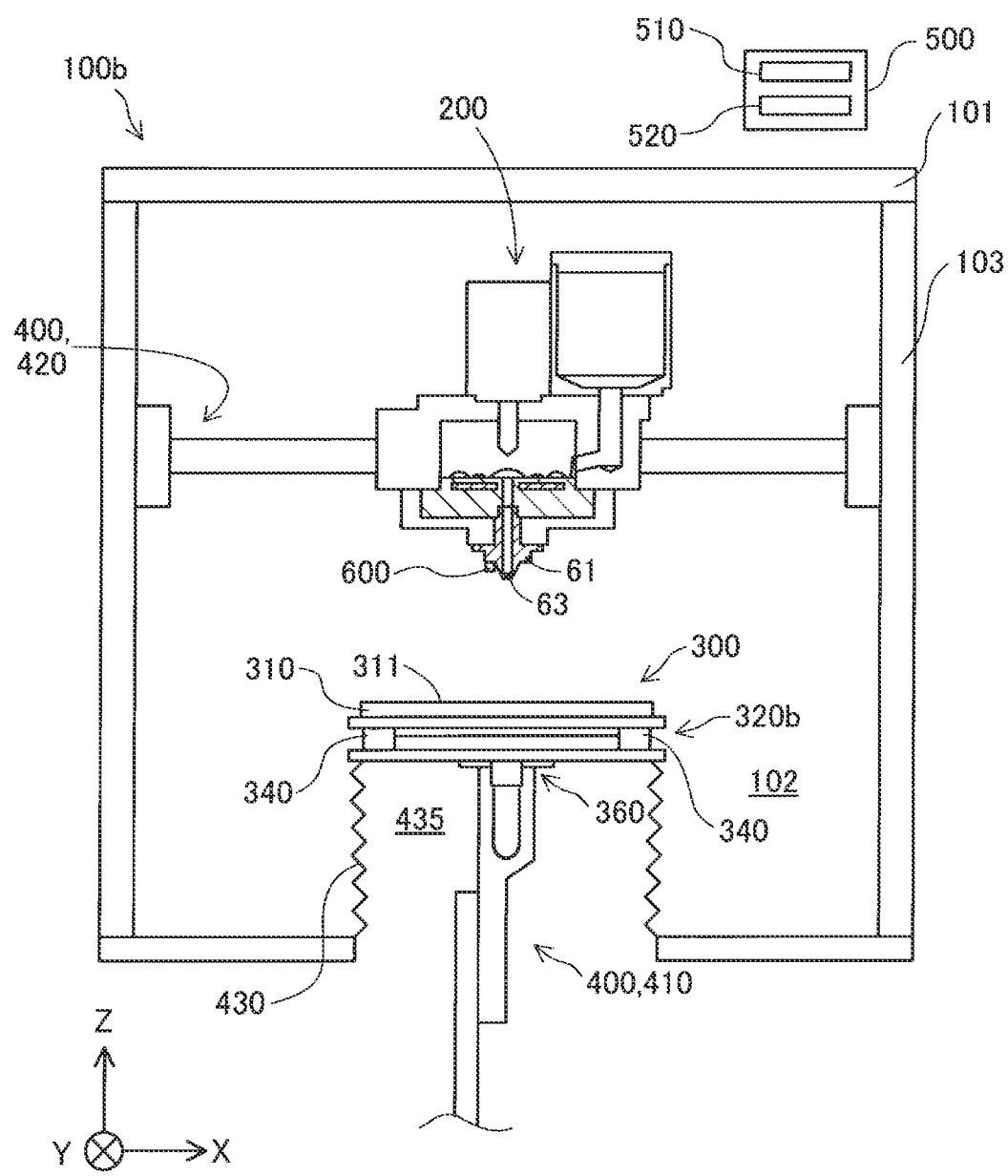
FIG. 12 is an explanatory diagram illustrating a schematic configuration of a three-dimensional shaping device of a third embodiment.

FIG. 12 is a diagram illustrating a schematic configuration of a three-dimensional shaping device 100b of a third embodiment. In the present embodiment, unlike the first embodiment, the three-dimensional shaping device 100b includes a detecting unit 510, a posture control unit 520, and a distance measuring sensor 600. A portion not specifically described in a configuration of the three-dimensional shaping device 100b has a similar configuration as that of the first embodiment.

In the present embodiment, unlike the first embodiment, four individual adjusting units included in a posture adjusting unit 320b are implemented by electric actuators whose heights at which the individual adjusting units support the support unit 330 can be changed. In the present embodiment, unlike the first embodiment, the support unit 330 does not have the openings 336 illustrated in FIG. 6 and the like. Further, unlike the first embodiment, the height of each individual adjusting unit is not adjustable by the tools.

The detecting unit 510 detects the degree of parallelism between the tip surface 63 of the nozzle 61 and the shaping surface 311 of the table 310. In the present embodiment, the detecting unit 510 detects the degree of parallelism based on a plurality of measured values obtained by the distance measuring sensor 600. The detecting unit 510 of the present embodiment is a function unit implemented by the control unit 500 executing a program. In another embodiment, the detecting unit 510 may be implemented by, for example, a computer separate from the control unit 500.

The distance measuring sensor 600 is fixed to the nozzle 61 and measures a distance from the distance measuring sensor 600 to the shaping surface 311. The distance measuring sensor 600 of the present embodiment is implemented by a laser displacement sensor including a light emitting unit that emits a laser toward the shaping surface 311 and a light receiving unit that receives the laser reflected by the shaping surface 311. The distance measuring sensor 600 may use, for example, a phase difference detecting method, a triangular distance measuring method, or a time of flight (TOF) method. The control unit 500 controls an operation of the distance measuring sensor 600, and receives and acquires the measured value. In another embodiment, the distance measuring sensor 600 may be implemented by, for example, a contact displacement sensor.

By controlling the driving unit 400 and the distance measuring sensor 600, the control unit 500 functioning as the detecting unit 510 causes the nozzle 61 to move relative to the table 310 in directions along the tip surface 63, that is, in the X direction and the Y direction, and measures distances between the plurality of points on the shaping surface 311 and the distance measuring sensor 600 while changing a position of the distance measuring sensor 600 with respect to the shaping surface 311 in the X direction and the Y direction. Accordingly, the control unit 500 acquires measured values of a plurality of distances. In the present embodiment, the control unit 500 measures distances between four corners of the shaping surface 311 and the distance measuring sensor 600 by the distance measuring sensor 600, and acquires four measured values.

The posture control unit 520 controls the posture adjusting unit 320 based on a detection result obtained by the detecting unit 510 to adjust the degree of parallelism between the tip surface 63 and the shaping surface 311 to a predetermined degree or more. The posture control unit 520 of the present embodiment is a function unit implemented by the control unit 500 executing a program. In another embodiment, the posture control unit 520 may be implemented by, for example, a computer separate from the control unit 500.

In the present embodiment, the control unit 500 functioning as the posture control unit 520 controls the electric actuators constituting the individual adjusting units based on the detection result of the degree of parallelism to adjust the heights of the individual adjusting units individually. More specifically, when the control unit 500 detects that the degree of parallelism is less than the predetermined degree, for example, the control unit 500 adjusts the heights of the individual adjusting units based on a statistic of the measured distances such that the degree of parallelism is equal to or higher than the predetermined degree. For example, the control unit 500 controls the individual adjusting unit closest to a position, where a distance with a largest difference from an average value is measured, to repeat processing of making the distance measured at that position match the average value, and processing of measuring the distance again by the distance measuring sensor 600 and detecting the degree of parallelism based on this measured value.

For example, at a timing after preheating of the table 310 is completed and before stacking of the shaping material is started, the control unit 500 detects the parallelism between the tip surface 63 and the shaping surface 311 described above, and controls the posture adjusting unit 320b based on the detected parallelism. Accordingly, the shaping material can be stacked on the shaping surface 311 in a state where the parallelism between the tip surface 63 and the shaping surface 311 is increased.

The three-dimensional shaping device 100b of the present embodiment described above includes the detecting unit 510 that detects the degree of parallelism between the tip surface 63 of the nozzle 61 and the shaping surface 311. Therefore, the posture adjusting unit 320b can be adjusted with reference to the degree of parallelism detected by the detecting unit 510.

In the present embodiment, the detecting unit 510 controls the driving unit 400 that causes the nozzle 61 to move relative to the table 310 in the direction along the tip surface 63, and the distance measuring sensor 600 fixed to the nozzle 61, and then acquires a plurality of measured values by the distance measuring sensor 600, and detects the degree of parallelism between the tip surface 63 and the shaping surface 311 based on the plurality of acquired measured values. Therefore, the degree of parallelism between the tip surface 63 and the shaping surface 311 can be easily detected.

The present embodiment provides the posture control unit 520 that controls the posture adjusting unit 320b based on the detection result obtained by the detecting unit 510 to adjust the degree of parallelism to the predetermined degree or more. Accordingly, a three-dimensional shaped object can be shaped in a state where the degree of parallelism between the tip surface 63 and the shaping surface 311 is increased, so that a shaping accuracy of the three-dimensional shaped object can be improved.

In another embodiment, similar to the first embodiment, the individual adjusting units may be configured to be adjusted by the tools inserted into the openings 336 of the support unit 330. In this case, for example, with reference to the detection result obtained by the detecting unit 510, the first tool TL1 and the second tool TL2 are used to adjust each of the individual adjusting units such that the degree of parallelism between the tip surface 63 and the shaping surface 311 becomes the predetermined degree or more. In this case, the posture control unit 520 may not be provided.

D. Fourth Embodiment

Figure 13:
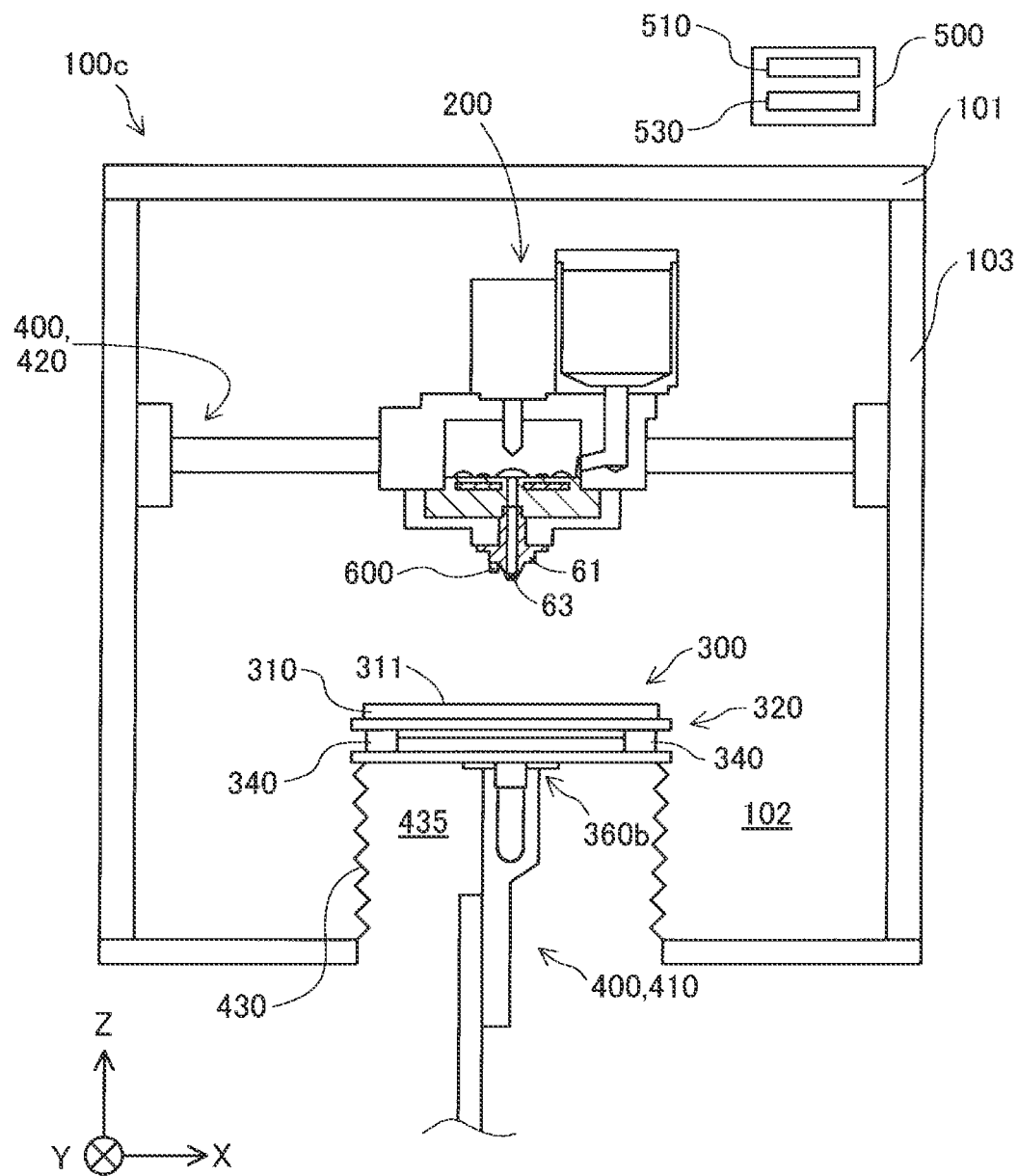
FIG. 13 is an explanatory diagram illustrating a schematic configuration of a three-dimensional shaping device of a fourth embodiment.

FIG. 13 is an explanatory diagram illustrating a schematic configuration of a three-dimensional shaping device 100c of a fourth embodiment. In the present embodiment, similar to the third embodiment, the three-dimensional shaping device 100c includes the detecting unit 510 and the distance measuring sensor 600. Meanwhile, unlike the third embodiment, the three-dimensional shaping device 100c does not include the posture control unit 520, and includes a cooling control unit 530. The posture adjusting unit 320 of the present embodiment has the same configuration as in the first embodiment. A portion not specifically described in the configuration of the three-dimensional shaping device 100c is the same as that of the third embodiment.

Unlike the first embodiment, a cooling unit 360b of the present embodiment has four ducts for individually supplying air to the four individual adjusting units 321, and four aspiration fans for blowing the air to the ducts. Each duct is configured such that the aspiration fans and the cases 340 that cover the individual adjusting units 321 corresponding to the aspiration fans are coupled one-to-one.

The cooling control unit 530 controls the cooling unit 360b based on a detection result obtained by the detecting unit 510 to adjust the degree of parallelism between the tip surface 63 and the shaping surface 311 to a predetermined degree or more. The cooling control unit 530 of the present embodiment is a function unit implemented by the control unit 500 executing a program. In another embodiment, the cooling control unit 530 may be implemented by, for example, a computer separate from the control unit 500.

In the present embodiment, the control unit 500 functioning as the cooling control unit 530 controls outputs of the aspiration fans individually provided for the individual adjusting units 321 based on the detection result obtained by the detecting unit 510. When the degree of parallelism is detected to be less than the predetermined degree, for example, the control unit 500 adjusts the outputs of the aspiration fans based on a statistic of measured distances such that the degree of parallelism is equal to or higher than the predetermined degree. For example, the control unit 500 controls the output of the aspiration fan corresponding to the individual adjusting unit 321 closest to the position, where a distance with a largest difference from an average value is measured, to repeat the processing of making the distance measured at that position match the average value, and the processing of measuring the distance again by the distance measuring sensor 600 and detecting the degree of parallelism based on this measured value. More specifically, when the measured distance is larger than the average value, the control unit 500 prevents thermal expansion of the individual adjusting unit 321 by increasing the output of the aspiration fan. Meanwhile, when the measured distance is smaller than the average value, the control unit 500 promotes the thermal expansion of the individual adjusting unit 321 by decreasing the output of the aspiration fan. After the degree of parallelism is adjusted by the cooling control unit 530 in this way, for example, the first tool TL1 and the second tool TL2 may be used to adjust the heights of the individual adjusting units 321 to adjust the degree of parallelism higher.

The three-dimensional shaping device 100c of the present embodiment described above includes the cooling control unit 530 that controls the cooling unit 360b based on the detection result obtained by the detecting unit 510 to adjust the degree of parallelism to a predetermined degree or more. Therefore, by controlling the cooling unit 360b to control the dimensional change due to the thermal expansion of the posture adjusting unit 320, the degree of parallelism between the tip surface 63 and the shaping surface 311 can be increased to a predetermined degree or more.

In another embodiment, even when the cooling unit 360 does not include the duct and the aspiration fan respectively provided for the individual adjusting units 321, the cooling unit 360 can be controlled by the cooling control unit 530 to adjust the degree of parallelism similarly to the fourth embodiment as long as, for example, an amount of the air blown to each of the individual adjusting units 321 can be adjusted. For example, when a duct commonly provided for the plurality of individual adjusting units 321 is provided with a shutter for adjusting the amount of the air supplied to each of the individual adjusting units 321, the cooling control unit 530 may control opening and closing of the shutter based on the detection result obtained by the detecting unit 510. When the cooling unit 360 is not a blower but is implemented by, for example, a flow path or a pump for supplying cooling water or a refrigerant to the individual adjusting units 321, similarly, the cooling control unit 530 also can adjust the degree of parallelism by controlling an output of the pump or opening and closing of the flow path.

E. Other Embodiments (E-1) In the above embodiments, the air blowing unit 361 includes the air flow paths 365 and the air blowing mechanisms 366, and supplies the air introduced into the air flow paths 365 by the air blowing mechanisms 366 to the internal spaces 341 in the cases 340 where the individual adjusting units 321 are accommodated. Alternatively, the individual adjusting units 321 may not be accommodated in the cases 340, and for example, the individual adjusting units 321 may be disposed so as to face outlets of the air flow paths 365, and the air introduced into the air flow paths 365 may be blown to the individual adjusting units 321. The air blowing units 361 may not supply the air to the posture adjusting unit 320 via the air flow paths 365, and for example, the air blowing units 361 may be implemented by air blowing fans capable of blowing the air directly to the posture adjusting unit 320.

(E-2) In the above embodiments, the cooling unit 360 includes the air blowing units 361 that supply the air to the posture adjusting unit 320. Alternatively, the cooling unit 360 may not include the air blowing units 361. For example, the cooling unit 360 may be configured to supply cooling water or a refrigerant to the posture adjusting unit 320 to cool the posture adjusting unit 320. In this case, for example, similar to a case where the air flow path 365 and the air blowing mechanism 366 are provided in common for the plurality of individual adjusting units 321, by providing a flow path, a pump, or the like in common for the plurality of individual adjusting units 321, the plurality of individual adjusting units 321 can be easily cooled at one time.

(E-3) In the above embodiments, the mounting portion 331 of the support unit 330 functions as a heating unit that heats the table 310. Alternatively, the mounting portion 331 may not function as a heating unit. For example, a heating unit for heating the table 310 may be fixed to the discharging unit 200 or to an inner surface of the partition wall 103 of the chamber 101.

(E-4) In the above embodiments, the table 310 is detachably fixed to the support unit 330 by the magnetic force of the magnet provided on at least one of the table 310 and the support unit 330. Alternatively, the support unit 330 may not fix the table 310 by the magnetic force of the magnet. For example, the support unit 330 may perform the fixing by adsorbing the table 310 toward the mounting surface 332. In addition, the support unit 330 may perform the fixing by gripping the table 310 with a clamp or the like.

(E-5) In the above embodiments, the table 310 is detachably supported by the support unit 330. Alternatively, the support unit 330 may not detachably support the table 310, and for example, the table 310 and the support unit 330 may be integrally configured. In addition, the support unit 330 may not be provided, and for example, the table 310 may be directly supported by the posture adjusting unit 320.

(E-6) In the above embodiments, when viewed along the Z direction, the four individual adjusting units 321 are arranged at the positions corresponding to the four corners of the rectangular support unit 330. Alternatively, the individual adjusting units 321 may not be arranged at the positions corresponding to the four corners of the support unit 330. The number of the individual adjusting units 321 may be two or three, or five or more. The support unit 330 may not be rectangular when viewed along the Z direction.

(E-7) In the above embodiments, for example, the height of the individual adjusting unit 321 may be adjusted without going through the opening 336. For example, the individual adjusting unit 321 may not be accommodated in the case 340, and may be configured such that the height can be adjusted by bringing a tool or the like closer to the individual adjusting unit 321 from the periphery of the individual adjusting unit 321 in the X direction or the Y direction. In this case, the support unit 330 may not have the openings 336.

(E-8) In the above embodiments, the elastic member 373 of the urging member 370 is implemented by a spring. Alternatively, the elastic member 373 may be implemented by another elastic member such as an elastomer. For example, the tip member 374 may be implemented by a spring, an elastomer, or the like, and the receiving portion may be implemented by a spring, an elastomer, or the like.

(E-9) In the above embodiments, the distance measuring sensor 600 is fixed to the nozzle 61. Alternatively, the distance measuring sensor 600 may not be fixed to the nozzle 61. For example, the distance measuring sensor 600 may be fixed to the discharging unit 200 or the chamber 101. The nozzle 61, the discharging unit 200, and the chamber 101 may be provided with a plurality of distance measuring sensors 600 that are adjusted in advance such that positions of the distance measuring sensors in the Z direction correspond to each other. For example, the degree of parallelism between the tip surface 63 and the shaping surface 311 may be detected based on a sensor value obtained by a sensor for detecting an inclination of the tip surface 63 with respect to the horizontal plane, and a sensor value obtained by a sensor for detecting the inclination of the shaping surface 311 with respect to the horizontal plane. In this case, the sensor for detecting the inclination is implemented by, for example, a non-contact laser displacement sensor, a contact displacement sensor, or the like, similarly to the distance measuring sensor 600.

(E-10) In the above embodiments, the plasticizing unit 30 of the discharging unit 200 plasticizes the material by a flat screw and produces a shaping material. Alternatively, for example, the plasticizing unit 30 may rotate an in-line screw to plasticize the material to produce the shaping material. In addition, the discharging unit 200 may be configured as a head plasticizing and discharging a filament material.

(E-11) In the above embodiments, a pellet-shaped ABS resin material is used as a raw material to be supplied to the material supply unit 20. Alternatively, the three-dimensional shaping device 100 can shape a three-dimensional shaped object using, as a main material, various materials such as a material having thermoplasticity, a metal material, and a ceramic material. Here, the term "main material" means a major material for forming a shape of the three-dimensional shaped object, and means a material that occupies 50% by weight or more of the three-dimensional shaped object. The above-described shaping material includes a material acquired by melting the main material alone or a material acquired by melting the main material and a part of components contained in the main material into a paste form.

When the material having thermoplasticity is used as the main material, the plasticizing unit 30 produces the shaping material by plasticizing this material having thermoplasticity.

Examples of the material having thermoplasticity may include the following thermoplastic resin materials.

Example of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, and polyether ether ketone Additives such as a wax, a flame retardant, an antioxidant, and a heat stabilizer in addition to a pigment, a metal, and ceramic may be mixed into the material having thermoplasticity. In the plasticizing unit 30, the material having thermoplasticity is converted into a melted state by being plasticized by the rotation of the screw 40 and heating of the plasticizing heater 58. The shaping material produced by the melting of the material having thermoplasticity is discharged from the nozzle 61, and then cured due to a reduction in temperature.

The material having thermoplasticity is preferably injected from the nozzle 61 in a state of being heated to a temperature equal to or higher than a glass transition point of this material and completely melted. For example, a glass transition point of the ABS resin is about 120° C., and it is desirable that the ABS resin is discharged from the nozzle 61 at about 200° C.

In the three-dimensional shaping device 100, for example, the following metal materials may be used as the main material instead of the materials having thermoplasticity described above. In this case, it is desirable that a component to be melted at the time of producing the shaping material is mixed with a powder material acquired by converting the following metal materials into a powder, and then the mixture is fed as a raw material into the plasticizing unit 30.

Examples of Metal Material

A single metal such as magnesium (Mg), ferrum (Fe), cobalt (Co), chromium (Cr), aluminum (Al), titanium (Ti), copper (Cu), and nickel (Ni), or an alloy containing one or more of these metals Examples of Alloy Maraging steel, stainless steel, cobalt chromium molybdenum, titanium alloy, nickel alloy, aluminum alloy, cobalt alloy, and cobalt chromium alloy In the three-dimensional shaping device 100, the ceramic material may be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride. When the metal material or the ceramic material described above is used as the main material, the shaping material disposed on the shaping surface 311 may be cured by irradiating with a laser or sintering with hot air.

A powder material of the metal material or the ceramic material to be fed into the material supply unit 20 as the raw material may be a mixed material acquired by mixing a plurality of types of powders of a single metal, powders of an alloy, and powders of the ceramic material. Further, the powder material of the metal material or the ceramic material may be coated with, for example, the thermoplastic resin described above, or a thermoplastic resin other than those described above. In this case, the thermoplastic resin may be melted in the plasticizing unit 30 to exhibit fluidity.

For example, the following solvents may be added to the powder material of the metal material or the ceramic material to be fed into the material supply unit 20 as the raw material. As the solvent, one kind or a combination of two or more kinds selected from the following can be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate In addition, for example, the following binders may be added to the powder material of the metal material or the ceramic material to be fed into the material supply unit 20 as the raw material.

Example of Binder

Acrylic resin, epoxy resin, silicone resin, cellulose-based resin or other synthetic resins, polylactic acid (PLA), polyamide (PA), polyphenylene sulfide (PPS), polyetheretherketone (PEEK) or other thermoplastic resins F. Other Aspects The present disclosure is not limited to the above embodiments, and can be implemented by various aspects without departing from the gist of the present disclosure. For example, the present disclosure can be implemented in the following aspects. In order to solve a part or all of problems of the present disclosure, or to achieve a part or all of effects of the present disclosure, technical features of the above embodiments corresponding to technical features in the following aspects can be replaced or combined as appropriate. The technical features can be deleted as appropriate unless described as essential in the present specification.

(1) According to a first aspect of the present disclosure, a shaping stage for three-dimensional shaping is provided. The shaping stage includes: a table having a shaping surface on which a shaping material is discharged; a posture adjusting unit configured to adjust a posture of the shaping surface; and a cooling unit configured to cool the posture adjusting unit.

According to such an aspect, when the table is heated, the posture adjusting unit is cooled by the cooling unit, so that temperature rise of the posture adjusting unit due to temperature rise of the table can be prevented. Accordingly, as compared with a case where the posture adjusting unit is not cooled, a dimensional change due to thermal expansion of the posture adjusting unit can be prevented, and a dimension of the posture adjusting unit can be stabilized more quickly. Therefore, a posture of the table can be stabilized more quickly, and there is a high possibility that a time required for adjusting the posture of the table can be shortened.

(2) In the above aspect, the cooling unit may include an air blowing unit configured to supply air to the posture adjusting unit. According to such an aspect, by supplying the air to the posture adjusting unit by the air blowing unit, the posture adjusting unit can be easily cooled.

(3) In the above aspect, the shaping stage may further include a support unit having a mounting surface on which the table is mounted and configured to detachably support the table, in which the posture adjusting unit includes a plurality of individual adjusting units configured to support the support unit, and is configured to adjust a posture of the mounting surface by individually adjusting the individual adjusting units. According to such an aspect, the posture of the shaping surface can be adjusted accurately by adjusting the individual adjusting units individually to adjust the posture of the mounting surface.

(4) In the above aspect, when viewed along a mounting direction of the table, the support unit may have a rectangular shape, and the posture adjusting unit may include four individual adjusting units arranged at positions corresponding to four corners of the support unit respectively. According to such an aspect, the posture of the shaping surface can be adjusted more accurately by adjusting the individual adjusting units individually.

(5) In the above aspect, the cooling unit may include an air blowing unit configured to supply air to the posture adjusting unit, and the air blowing unit may include an air flow path through which the air is distributed to the plurality of individual adjusting units, and an air blowing mechanism configured to blow the air into the air flow path. According to such an aspect, for example, the plurality of individual adjusting units can be easily cooled at one time as compared with a case where the air flow path and the air blowing mechanism are individually provided for each of the individual adjusting units.

(6) In the above aspect, when viewed along the mounting direction of the table, the support unit may have openings at positions overlapping the individual adjusting units, the opening may be formed such that a tool for adjusting the individual adjusting unit is insertable, and the individual adjusting unit may be configured to be adjusted by the tool inserted into the opening. According to such an aspect, the individual adjusting unit can be easily adjusted.

(7) In the above aspect, the table may be detachably fixed to the support unit by a magnetic force of a magnet provided on at least one of the table and the support unit. According to such an aspect, the table can be detachably fixed to the support unit by a simple configuration.

(8) In the above aspect, the shaping stage may further include a receiving portion to come into contact with a side surface of the table mounted on the support unit, and an urging member configured to urge the table toward the receiving portion, in which the table may be sandwiched and supported by the receiving portion and the urging member. According to such an aspect, a position shift of the table mounted on the support unit can be prevented, and deformation such as warpage of the heated table can be prevented.

(9) According to a second aspect of the present disclosure, a three-dimensional shaping device is provided. The three-dimensional shaping device includes: the shaping stage as described above; a nozzle configured to discharge the shaping material to the shaping surface through a nozzle opening on a tip surface; a heating unit configured to heat the table; and a detecting unit configured to detect a degree of parallelism between the tip surface and the shaping surface. According to such an aspect, the posture adjusting unit can be adjusted with reference to a degree of parallelism detected by the detecting unit.

(10) In the above aspect, the three-dimensional shaping device may further include: a distance measuring sensor fixed to the nozzle in a predetermined posture and configured to measure a distance to the shaping surface; and a driving unit configured to move the nozzle relative to the table in a direction along the tip surface, in which the detecting unit may be configured to control the driving unit and the distance measuring sensor to acquire a plurality of measured values obtained by the distance measuring sensor, and detect the degree of parallelism based on the acquired measured values. According to such an aspect, the degree of parallelism between the tip surface and the shaping surface can be easily detected.

(11) In the above aspect, the three-dimensional shaping device may further include a posture control unit configured to control the posture adjusting unit based on a detection result obtained by the detecting unit to adjust the degree of parallelism to a predetermined degree or more. According to such an aspect, since a three-dimensional shaped object can be shaped on the shaping surface in a state where the degree of parallelism between the tip surface and the shaping surface is increased to the predetermined degree or more, a shaping accuracy of the three-dimensional shaped object can be improved.

(12) In the above aspect, the three-dimensional shaping device may further include a cooling control unit configured to control the cooling unit based on a detection result obtained by the detecting unit to adjust the degree of parallelism to a predetermined degree or more. According to such an aspect, by controlling the cooling unit to control a dimensional change due to thermal expansion, the degree of parallelism between the tip surface and the shaping surface can be increased to the predetermined degree or more.

What is claimed is:

1. A shaping stage for three-dimensional shaping, comprising:
   a table having a shaping surface on which a shaping material is discharged;
   a posture adjusting unit configured to adjust a posture of the shaping surface and a plurality of individual adjusting units configured to support the support unit, and is configured to adjust a posture of the mounting surface by individually adjusting the individual adjusting units;
   a support unit having a mounting surface on which the table is mounted and configured to detachably support the table; and
   a cooling unit configured to cool the posture adjusting unit, the cooling unit includes an air blowing unit configured to supply air to the posture adjusting unit, and the air blowing unit includes an air flow path through which the air is distributed to the plurality of individual adjusting units, and an air blowing mechanism configured to blow the air into the air flow path.

2. The shaping stage according to claim 1, wherein the cooling unit includes an air blowing unit configured to supply air to the posture adjusting unit.

3. The shaping stage according to claim 1, wherein when viewed along a mounting direction of the table,
   the support unit has a rectangular shape, and
   the posture adjusting unit includes four individual adjusting units arranged at positions corresponding to four corners of the support unit respectively.

4. The shaping stage according to claim 1, wherein
   when viewed along a mounting direction of the table, the support unit includes openings at positions overlapping the individual adjusting units,
   the opening is formed such that a tool for adjusting the individual adjusting unit is insertable, and
   the individual adjusting unit is configured to be adjusted by the tool inserted into the opening.

5. The shaping stage according to claim 1, wherein
   the table is detachably fixed to the support unit by a magnetic force of a magnet provided on at least one of the table and the support unit.

6. The shaping stage according to claim 1, further comprising:
   a receiving portion to come into contact with a side surface of the table mounted on the support unit; and
   an urging member configured to urge the table toward the receiving portion, wherein
   the table is sandwiched and supported by the receiving portion and the urging member.

7. A three-dimensional shaping device, comprising:
the shaping stage according to claim 1;
a nozzle configured to discharge the shaping material to the shaping surface through a nozzle opening on a tip surface;
a heating unit configured to heat the table; and
a detecting unit configured to detect a degree of parallelism between the tip surface and the shaping surface.

8. The three-dimensional shaping device according to claim 7, further comprising:
a distance measuring sensor fixed to the nozzle and configured to measure a distance to the shaping surface; and
a driving unit configured to move the nozzle relative to the table in a direction along the tip surface, wherein
the detecting unit is configured to
control the driving unit and the distance measuring sensor to acquire a plurality of measured values obtained by the distance measuring sensor, and
detect the degree of parallelism based on the acquired measured values.

9. The three-dimensional shaping device according to claim 7, further comprising:
a posture control unit configured to control the posture adjusting unit based on a detection result obtained by the detecting unit to adjust the degree of parallelism to a predetermined degree or more.

10. The three-dimensional shaping device according to claim 7, further comprising:
a cooling control unit configured to control the cooling unit based on a detection result obtained by the detecting unit to adjust the degree of parallelism to a predetermined degree or more.

* * * * *